(12) United States Patent
Van Niekerk et al.

(10) Patent No.: US 10,974,823 B2
(45) Date of Patent: Apr. 13, 2021

(54) UNMANNED AERIAL VEHICLE WITH PROPELLER PROTECTION AND HIGH IMPACT-SURVIVABILITY

(71) Applicant: Vantage Robotics, LLC, San Francisco, CA (US)

(72) Inventors: Johannes Becker Van Niekerk, Livermore, CA (US); Tobin Fisher, San Francisco, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 0 days.

(21) Appl. No.: 14/990,057

(22) Filed: Jan. 7, 2016

(65) Prior Publication Data

US 2016/0221671 A1 Aug. 4, 2016

Related U.S. Application Data

(60) Provisional application No. 62/101,084, filed on Jan. 8, 2015.

(51) Int. Cl.
*B64C 27/08* (2006.01)
*B64C 39/02* (2006.01)
(Continued)

(52) U.S. Cl.
CPC .............. *B64C 27/08* (2013.01); *B64C 27/20* (2013.01); *B64C 27/32* (2013.01); *B64C 39/02* (2013.01);
(Continued)

(58) Field of Classification Search
CPC ............... B64C 1/30; B64C 2201/027; B64C 2201/042; B64C 2201/108;
(Continued)

(56) References Cited

U.S. PATENT DOCUMENTS 2,417,896 A * 3/1947 Zimmerman ......... B64C 39/026
244/17.15
3,184,183 A * 5/1965 Plasecki .................. B64C 27/20
244/23 R
(Continued)

FOREIGN PATENT DOCUMENTS

| WO | WO 2006/112578 | 10/2006 |
| WO | WO 2009/115300 | 9/2009 |
| WO | WO 2011/149544 | 12/2011 |

OTHER PUBLICATIONS

International Search Report and Written Opinion dated Jul. 25, 2016 for Application No. PCT/US2016/012369, filed Jan. 6, 2016 in 22 pages.

*Primary Examiner* — Medhat Badawi
(74) *Attorney, Agent, or Firm* — Knobbe, Martens, Olson & Bear, LLP

(57) ABSTRACT

An unmanned aerial vehicle (UAV) includes a body that supports breakaway components. One component is a battery pack which powers the vehicle. Two other components are pod assemblies, which each include at least one motor and one propeller. Each motor is supported within a support ring using spokes or filament. The spokes keep the motor firmly stable during operation and also effectively encage the otherwise dangerous spinning propeller. This allows the vehicle to operate with a higher level of safety than conventional UAVs. The breakaway feature can be established using magnets.

23 Claims, 27 Drawing Sheets

(51) Int. Cl.
   *B64C 27/20* (2006.01)
   *B64C 27/32* (2006.01)
   *B64D 47/08* (2006.01)

(52) U.S. Cl.
   CPC ............ *B64C 39/024* (2013.01); *B64D 47/08* (2013.01); *B64C 2201/024* (2013.01); *B64C 2201/027* (2013.01); *B64C 2201/042* (2013.01); *B64C 2201/108* (2013.01); *B64C 2201/127* (2013.01); *B64C 2201/162* (2013.01)

(58) Field of Classification Search
   CPC .......... B64C 2201/20; B64C 2201/201; B64C 27/006; B64C 27/08; B64C 39/024; B64C 29/0025; B64C 2201/128; B64C 2201/162; B64C 2201/044; B64C 2201/127; B64D 35/06; B64D 27/24; B64D 33/08; B64D 47/08; H02K 5/02; H02K 7/14; H02K 9/22; Y02T 50/60; Y02T 50/62
   See application file for complete search history.

(56) References Cited

U.S. PATENT DOCUMENTS

| | | | | |
|---|---|---|---|---|
| 3,265,329 | A * | 8/1966 | Postelson | B64C 27/20 180/122 |
| 5,071,383 | A * | 12/1991 | Kinoshita | A63H 27/10 244/26 |
| 6,293,492 | B1 * | 9/2001 | Yanagisawa | B64C 27/10 244/17.23 |
| 8,322,648 | B2 * | 12/2012 | Kroetsch | A63H 27/12 244/17.23 |
| 8,608,103 | B2 * | 12/2013 | Martin | B64D 33/10 244/4 A |
| 8,695,916 | B2 * | 4/2014 | Martin | B64C 39/026 244/4 A |
| 8,979,016 | B2 * | 3/2015 | Hayden, III | B64C 29/00 244/12.2 |
| 8,997,677 | B1 * | 4/2015 | Rivoli | F42B 19/00 114/316 |
| 9,171,479 | B2 * | 10/2015 | Martin | G09B 9/042 |
| 9,457,901 | B2 * | 10/2016 | Bertrand | A63H 27/12 |
| 9,616,998 | B2 * | 4/2017 | Oakley | B64C 27/08 |
| 2009/0216394 | A1 * | 8/2009 | Heppe | B64C 39/024 701/16 |
| 2009/0283629 | A1 | 11/2009 | Kroetsch et al. | |
| 2012/0083945 | A1 * | 4/2012 | Oakley | B64C 27/08 701/2 |
| 2013/0134254 | A1 | 5/2013 | Moore | |
| 2014/0034776 | A1 | 2/2014 | Hutson | |
| 2014/0061376 | A1 | 3/2014 | Fisher et al. | |
| 2014/0131507 | A1 * | 5/2014 | Kalantari | A63H 27/12 244/2 |
| 2014/0175214 | A1 * | 6/2014 | Lundgren | B64D 47/08 244/17.23 |
| 2016/0176514 | A1 * | 6/2016 | Lavagen | B64C 39/02 244/50 |
| 2016/0229530 | A1 * | 8/2016 | Welsh | B64C 39/024 |
| 2016/0332747 | A1 * | 11/2016 | Bradlow | B64D 47/08 |
| 2016/0340021 | A1 * | 11/2016 | Zhang | B64C 27/08 |
| 2017/0030715 | A1 * | 2/2017 | Song | G01C 19/5783 |
| 2017/0183074 | A1 * | 6/2017 | Hutson | B64C 1/061 |
| 2017/0225782 | A1 * | 8/2017 | Kohstall | B64C 39/024 |
| 2017/0313418 | A1 * | 11/2017 | Yoon | B64C 39/024 |
| 2017/0322563 | A1 * | 11/2017 | Kohstall | G05D 1/12 |

* cited by examiner

UNMANNED AERIAL VEHICLE WITH PROPELLER PROTECTION AND HIGH IMPACT-SURVIVABILITY

CROSS-REFERENCE TO RELATED APPLICATIONS

This application claims priority to U.S. Provisional Application No. 62/101,084, filed Jan. 8, 2015, which is hereby incorporated by reference in its entirety.

BACKGROUND

Technical Field

Embodiments disclosed herein relate generally to aerial vehicles, and more particularly to structural improvements for multi-rotor unmanned aerial vehicles (UAVs) that enable safer operation during flight and high survivability in the event of an impact.

Background

Small UAVs are increasingly used for aerial reconnaissance, typically recording video and still images for later viewing, or viewing in real-time. Depending on the size and desired lift-capacity, a typical UAV is powered by either a single gas-powered engine or several electric powered motors with the required thrust for lift being generated by at least one, but usually three or more spinning propellers. Each propeller includes one or more radially disposed blades extending from a central hub. The hub of each propeller is mechanically connected, either directly or indirectly through a transmission, to the drive shaft of the engine or each motor used. At first glance, a UAV resembles a radio controlled model helicopter, except that a helicopter's conventional tail rotor is not required with a UAV since the multi-propeller design effectively cancels out any propeller-generated rotational thrust that must otherwise be controlled using a tail-rotor in single-propeller designs.

As with model helicopters, the unprotected spinning blades pose a tremendous risk with the potential of inflicting damage to the craft itself or nearby property, but more importantly to the operator of the UAV or other people or animals.

Many attempts have been made to protect the blades by enclosing them in rigid frame structures or using so-called prop guards, which either partially surround or fully encircle the propellers. These frame structures or guards are generally made from EPS (expanded polystyrene), injected molded plastics, or composites and although are usually effective at preventing accidental side-contact with a spinning propeller, they usually do not survive moderate impact, should the UAV impact an object during flight. These prior art prop-protecting structures typically flex and deform during impact and cause damage to the craft and the propellers.

While each approach to protect the propeller from damage or contact has specific benefits, they all also include one or more weaknesses, such as being too heavy, too fragile, too large, creating excessive wind drag, or creating unwanted turbulence around the spinning propeller, which reduces performance and efficiency. Additionally, when these protections only protect the tips of the spinning propellers from the side, it remains possible to access the propellers from either the top or bottom. This accessibility creates a tremendous hazard to a person's fingers and also makes the propellers vulnerable to damage from sticks, rocks, or any other foreign objects.

Another problem with conventional UAVs is that they rarely survive impact and often become "grounded" until a broken part can be repaired or replaced. The fragility of conventional UAVs is both frustrating and counter-productive to carrying out their intended task.

SUMMARY

Some innovations relate to an unmanned aerial vehicle (UAV), including a UAV body, a plurality of shielded propellers releasably secured relative to the UAV body, each shielded propeller including a propeller, an outer guard ring, and protective structures extending radially inward from the outer guard ring on opposite sides of the propeller, a battery housing releasably secured relative to the UAV body, where at least one of the battery or the plurality of shielded propellers are configured to release from the UAV body upon impact.

The protective structures of the plurality of shielded propellers can include a plurality of apertures extending therethrough to reduce the impact of protective structures on airflow from the propellers. The plurality of shielded propellers can include a first pair of shielded propellers having a bridge structure extending between the outer guard rings of the first pair of shielded propellers, the bridge structure including an electrical coupling mechanism and a mechanical coupling mechanism.

The electrical coupling mechanism can include a plurality of electric contacts configured to provide power and control to the first pair of controllers, and the mechanical coupling mechanism can include a plurality of magnets configured to releasably secure the bridge structure relative to the UAV body. The plurality of magnets can include a first arrangement of magnets on the bridge structure and a second arrangement of magnets on the UAV body configured to be aligned with the first arrangement of magnets on the bridge structure. The first and second pluralities of magnets can be arranged in a pattern which compels a particular orientation of the first pair of shielded propellers relative to the UAV body. The plurality of shielded propellers can include a second pair of shielded propellers having a bridge structure extending between the outer guard rings of the first pair of shielded propellers, and at least one guard ring of the first pair of shielded propellers can be configured to be magnetically secured relative to at least one guard ring of the second pair of shielded propellers. The at least one guard ring of the first pair of shielded propellers can include a first plurality of magnets and the at least one guard ring of the second pair of shielded propellers can include a second plurality of magnets configured to be aligned with a first plurality of magnets, and the first and second plurality of magnets can be arranged such that the polarities of the first and second plurality of magnets compel a particular orientation between the first and second pairs of shielded propellers.

The battery housing includes an electrical coupling mechanism and a mechanical coupling mechanism. The electrical coupling mechanism can include a plurality of electric contacts configured to place the battery in electric communication with the UAV body, and the mechanical coupling mechanism can include a plurality of magnets configured to releasably secure the battery housing relative to the UAV body The UAV can additionally include a camera module, and a vibration isolation mechanism for isolating the camera module from the vibration of the plurality of shielded propellers. The plurality of shielded propellers can include a first pair of shielded propellers having a bridge structure extending between the outer guard rings of the first pair of shielded propellers, the bridge structure including an electrical coupling mechanism and a mechanical coupling mechanism, and the vibration isolation mechanism can form a part of a mechanical connection between the mechanical coupling mechanism and the first pair of shielded propellers.

The protective structures of each of the plurality of shielded propellers can include a first guard structure located on a first side of the at least one propeller blade and includes a central aperture overlying at least a portion of a swept volume of the propeller, and a second guard structure extending across the guard ring and underlying the swept volume of the propeller.

Other innovations relate to a propeller assembly for use with an unmanned aerial vehicle (UAV), the propeller assembly including a propeller, the propeller including a central hub, and at least one propeller blade configured to rotate in a first plane through a first swept volume about the central hub, and a propeller guard assembly, including a guard ring disposed radially outward of the first swept volume of the at least one propeller blade, a first guard structure located on a first side of the at least one propeller blade and configured to allow airflow therethrough, and a second guard structure located on a second side of the at least one propeller blade and configured to allow airflow therethrough.

The propeller can be configured to generate airflow towards the second guard structure. The second guard structure can extend across the guard ring and is not coplanar with the first swept volume of the at least one propeller blade, and where the second guard structure supports the central hub of the propeller. The first guard structure can extend inward from the guard ring and includes a central aperture overlying at least a portion of the first swept volume of the at least one propeller blade.

The propeller assembly can additionally include a second propeller including a central hub, and at least one propeller blade configured to rotate in a second plane through a second swept volume about the central hub, a second propeller guard assembly, including a guard ring disposed radially outward of the second swept volume of the at least one propeller blade of the second propeller, a first guard structure located on a first side of the at least one propeller blade of the second propeller and configured to allow airflow therethrough, and a second guard structure located on a second side of the at least one propeller blade of the second propeller and configured to allow airflow therethrough, and a bridge support extending between the guard ring of the first propeller guard assembly and the guard ring of the second propeller guard assembly. The bridge support can include an electrical coupling mechanism and a mechanical coupling mechanism. The electrical coupling mechanism can include a plurality of contact pads in electrical communication with at least one of the central hubs of the first or second controllers. The mechanical coupling mechanism can include a plurality of magnets.

The propeller assembly can additionally include a third propeller including a central hub, and at least one propeller blade configured to rotate in a third plane through a third swept volume about the central hub, a third propeller guard assembly, including a guard ring disposed radially outward of the third swept volume of the at least one propeller blade of the third propeller, a first guard structure located on a first side of the at least one propeller blade of the third propeller and configured to allow airflow therethrough, and a second guard structure located on a second side of the at least one propeller blade of the third propeller and configured to allow airflow therethrough, and a fourth propeller including a central hub, and at least one propeller blade configured to rotate in a fourth plane through a fourth swept volume about the central hub, a fourth propeller guard assembly, including a guard ring disposed radially outward of the second swept volume of the at least one propeller blade of the fourth propeller, a first guard structure located on a first side of the at least one propeller blade of the fourth propeller and configured to allow airflow therethrough, and a second guard structure located on a second side of the at least one propeller blade of the fourth propeller and configured to allow airflow therethrough, and a second bridge structure extending between the guard ring of the third propeller guard assembly and the guard ring of the fourth propeller guard assembly.

The guard ring of the first propeller guard assembly can be releasably secured relative to the guard ring of the third propeller guard assembly, and the guard ring of the second propeller guard assembly can be releasably secured relative to the guard ring of the fourth propeller guard assembly. The guard ring of the first propeller guard assembly can be releasably secured relative to the guard ring of the third propeller guard assembly via at least one magnet, and the guard ring of the second propeller guard assembly can be releasably secured relative to the guard ring of the fourth propeller guard assembly via at least one magnet. The propeller assembly can additionally include a first hinge coupling the guard ring of the first propeller guard assembly to the guard ring of the third propeller guard assembly and a second hinge coupling the guard ring of the second propeller guard assembly to the guard ring of the fourth propeller guard assembly.

Other innovations relate to an unmanned aerial vehicle (UAV), including a fuselage extending between a nose and a tail, the fuselage including a first attachment site including a first electrical connector and a first mechanical connector, a second attachment site including a second electrical connector and a second mechanical connector, the second attachment site located closer to the tail than the first attachment site, and a third attachment site including a third electrical connector and a third mechanical connector, the third attachment site located closer to the tail than the second attachment site, a battery pack releasably secured to the fuselage at the second attachment site, a first thrust pod pair assembly releasably secured to the fuselage at the first attachment site, and a second thrust pod pair assembly releasably secured to the fuselage at the third attachment site.

The UAV can additionally include a camera module located adjacent the nose of the fuselage. The first thrust pod pair assembly can include a first thrust pod including a first propeller, and a first guard ring extending around the first propeller, a second thrust pod including a second propeller, and a second guard ring disposed radially outward of the second propeller, and a bridge structure extending between the first and second guard rings. The bridge structure can include a fourth electrical connector configured to connect with the first electrical connector at the first attachment site of the fuselage, and a fourth mechanical connector configured to connect with the first mechanical connector at the first attachment site of the fuselage.

At least one of the first and fourth mechanical connectors can include a magnet. At least one of the first and fourth electrical connectors can include one of a pogo pin electrical connector or a leaf spring electrical connector. The bridge structure can include at least one flexible vibration isolation mount.

The first thrust pod pair assembly can be secured to the second pod pair assembly. The first thrust pod pair assembly can be secured to the second pod pair assembly via at least one magnetic connection. The first thrust pod pair assembly can be secured to the second pod pair assembly via at least one hinge.

BRIEF DESCRIPTION OF THE DRAWINGS

Various embodiments can be more fully understood from the following detailed description taken in conjunction with the accompanying drawings, in which.

DETAILED DESCRIPTION OF THE PREFERRED EMBODIMENT

Figure 1:
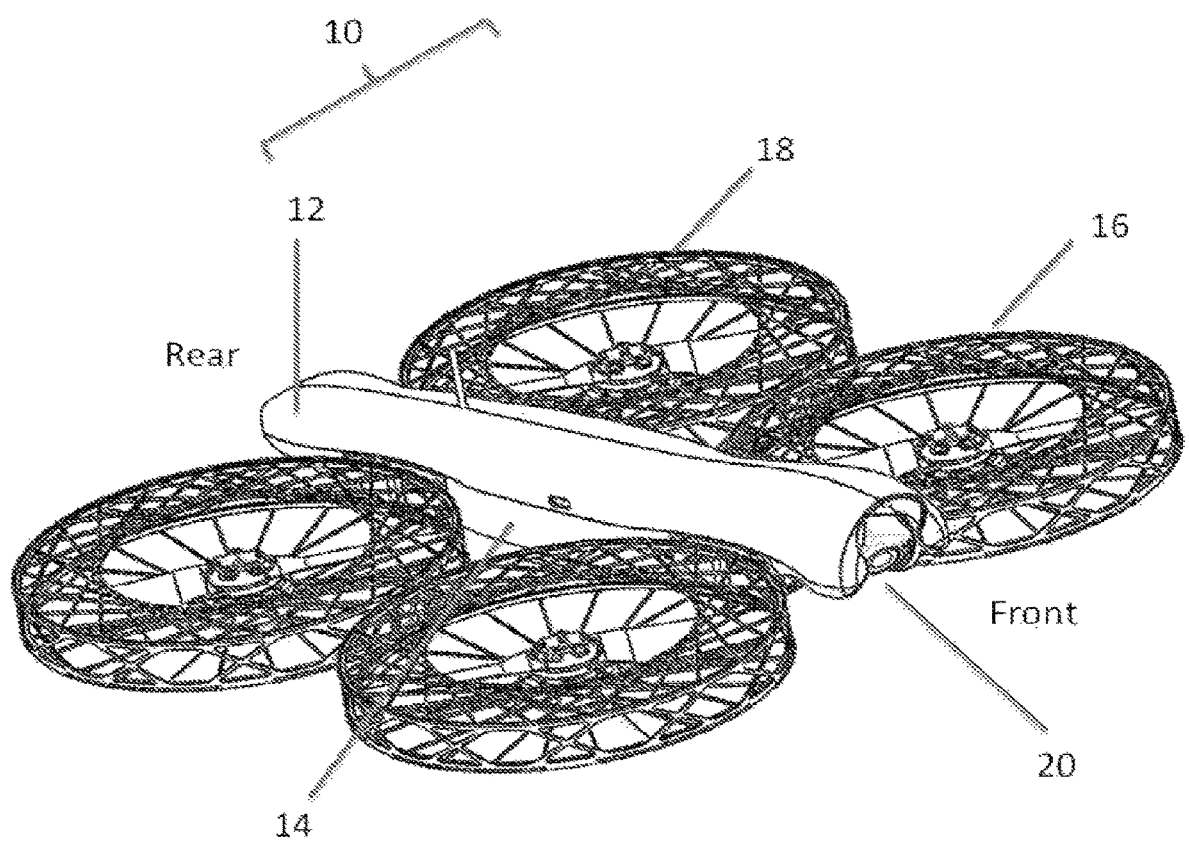
FIG. 1 is a perspective view of a UAV including a body, a front pod assembly, a rear pod assembly, a battery pack, and a camera module.
Figure 2:
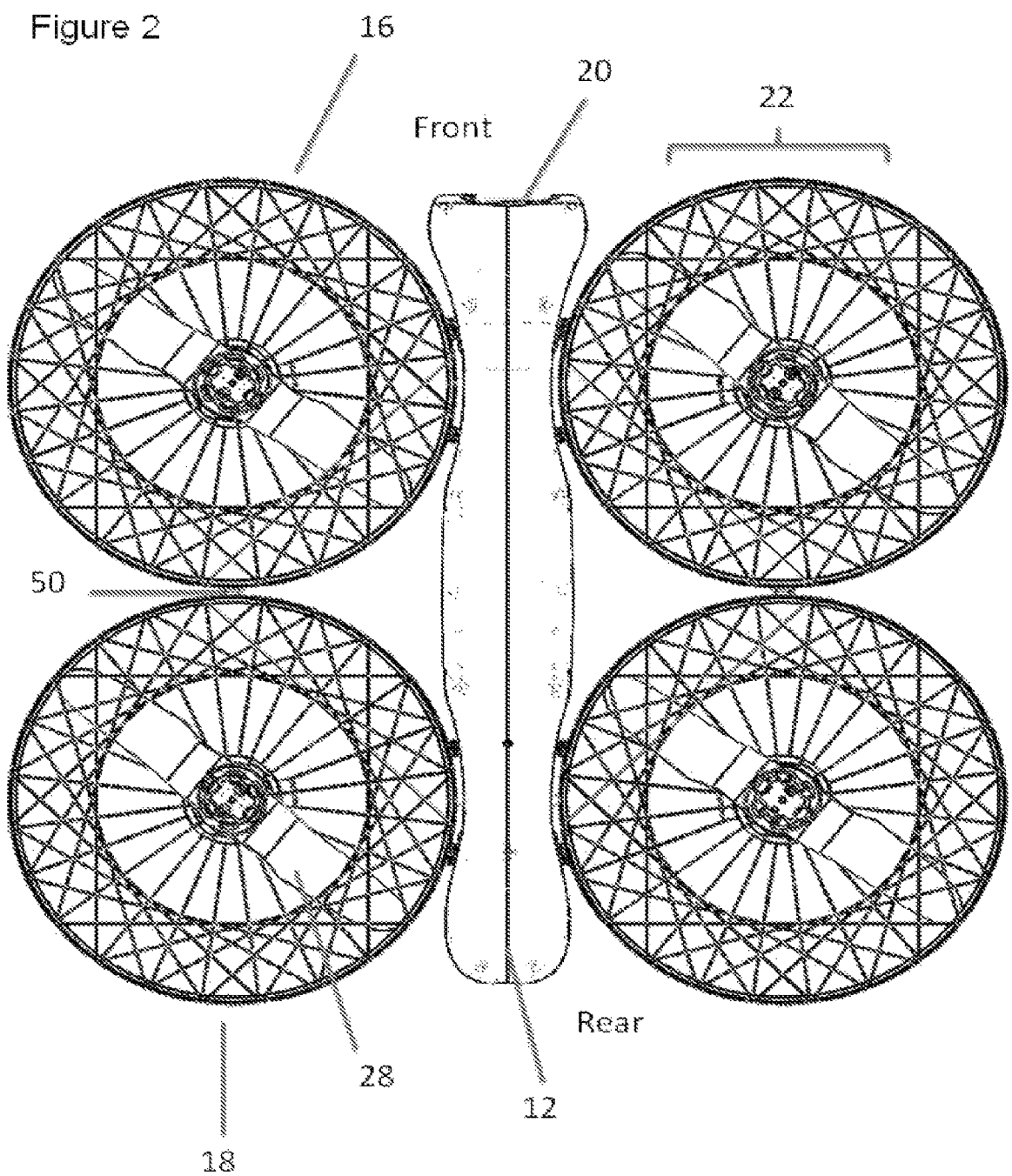
FIG. 2 is a top plan view of the UAV of FIG. 1.

FIG. 1 is a perspective view of a UAV including a body, a front pod assembly, a rear pod assembly, a battery pack, and a camera module. FIG. 2 is a top plan view of the UAV of FIG. 1. As can be seen in FIG. 1, an unmanned aerial vehicle (UAV) 10 includes a body 12, a battery pack 14, a front pod assembly 16 and a rear pod assembly 18. As explained in greater detail below, battery pack 14 and front and rear pod assemblies 16, 18 may be selectively attached to the underside of body 12 using magnets or other suitable mechanical coupling mechanisms. The use of magnets as a mechanical coupling mechanism allows the different components to be releasable attached to one another, and allows them to easily separate, should the UAV sustain a sufficient impact force during use. This separation of components will help mitigate damage to any of the components. For example, the battery pack 14 may be the heaviest of the components, and releasing the battery pack 14 from the other components can decrease the effect of the impact on, for example, the separated front and rear pod assemblies 16, 18.

Features of certain components of embodiments of UAVs are now discussed in turn.

a) Body

In some embodiments, fuselage or body 12 can be made from a strong lightweight plastic, such as ABS, or from a composite material, such as fiberglass or carbon-fiber reinforced resin. Other suitable materials may be used, as well. Body 12 can include one or more hollow cavities (not shown) which can be used to house various electronics, such as a radio receiver and a computer. In some embodiments, these electronic components can, in conjunction with appropriate software, control the flight operations and RC communications of UAV 10. In some embodiments, body 12 can also include a camera 20 that is used to record video or still images during a flight of the UAV. Such images can be stored in onboard memory, or transmitted to a remote site. As described in greater detail below, the underside of body 12 can include various mechanical and electronic connection points to secure and provide electrical communication between the onboard controlling circuitry and battery pack 14, and front and rear pod assemblies 16, 18. The mechanical connection points may include magnetic connectors.

b) Battery Pack

In some embodiments, battery pack 14 can include a battery housing enclosing one or more rechargeable batteries (not shown), such as lithium ion batteries or any other suitable battery. Battery pack 14 selectively securable, either directly or indirectly, to a portion of body 12 such as the underside of body 12 Battery 14 provides power via electrical connection 19 to the onboard electronics, camera 20, any operation lighting (not shown) and each motor, described below).

Figure 26:
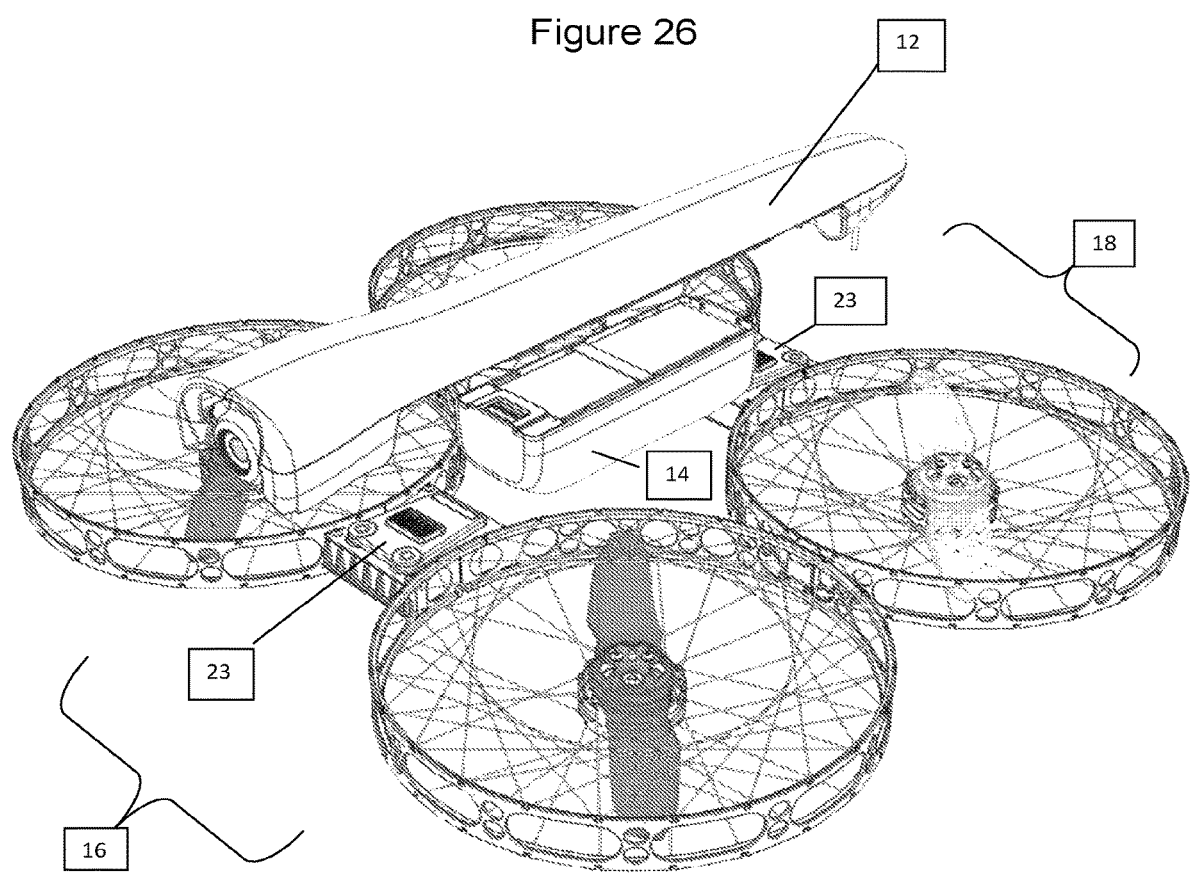
FIG. 26 is a perspective exploded view of a UAV, showing the body and the relative positions of the battery pack, and the front and rear pod assemblies.
Figure 27:
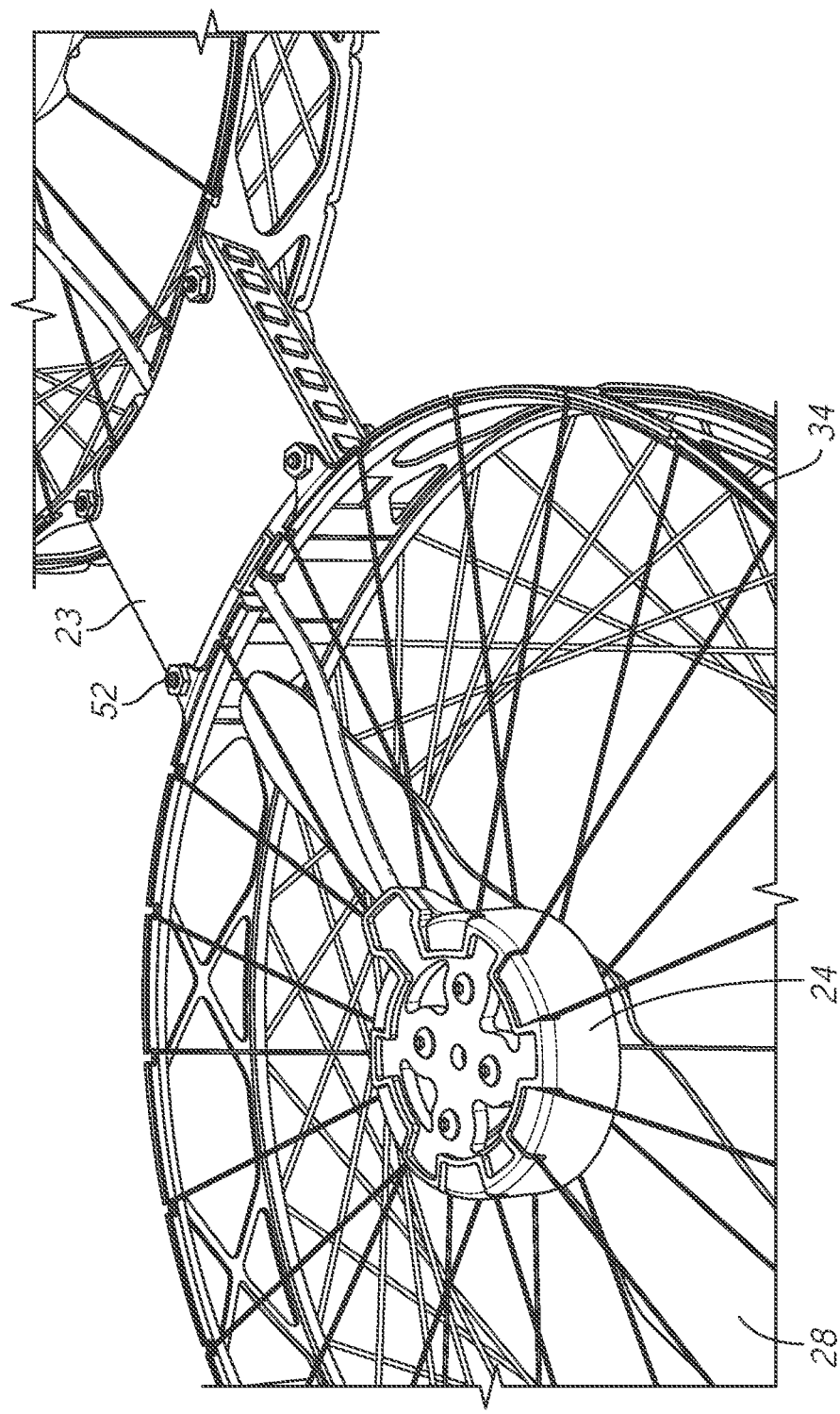
FIG. 27 is a perspective view of the underside of a thrust pod showing details of the central motor, the central hub, the bridge support, the lower motor support filaments.

This selective and/or releasable securement between the battery pack 14 and the body 12 can be accomplished through the use of any suitable mechanical connector, such as magnets or a metal plate such as the metal plate of FIG. 26. Magnets on the battery pack can be aligned with magnets (or metal plates) 17 secured to the underside of body 12, shown in FIGS. 21 and 22. The magnet-to-magnet (or magnet to metal plate) attraction force allows the relatively heavy battery pack to automatically dislodge upon impact of the UAV to help dissipate impact forces, such as during a crash and thereby help mitigate damage to the components of UAV 10.

The magnetic force between magnets on the battery pack and magnets 17 (or magnets and a metal plate) must be strong enough to securely hold battery 14 to body 12 during normal use, but not so strong as to prevent battery 14 to disengage during an impact between body 12 and a solid object (e.g., house, fence or ground). The strength of this force can be adjusted through both the size and number of magnets on the battery pack and/or magnets 17. In some embodiments, a magnet on the battery pack can be aligned with a magnet 17 on the UAV body 12 along an axis which remains generally vertical during operation of the device, such that the gravitational force pulling on battery pack 14 acts generally along the axis of alignment between the two connected magnets, with minimal shear force sliding the magnets away from one another. In other words, the facing surfaces of the magnets on the battery pack and magnets 17 may generally be near-horizontal during operation of the UAV 10, minimizing the shear component of the gravitational force during normal operation. Because shear forces may separate the magnets on the battery pack from the magnets 17 more readily than forces acting along the axis of attraction of the magnets, the shear forces which can occur during an impact can more easily dislodge the battery pack 14 from the UAV body 12. In other embodiments, however, the magnets on the battery pack and magnets 17 may be oriented in any suitable direction, and need not be oriented along a near-vertical axis during operation.

c) Front and Rear Pod Assemblies

Figure 4:
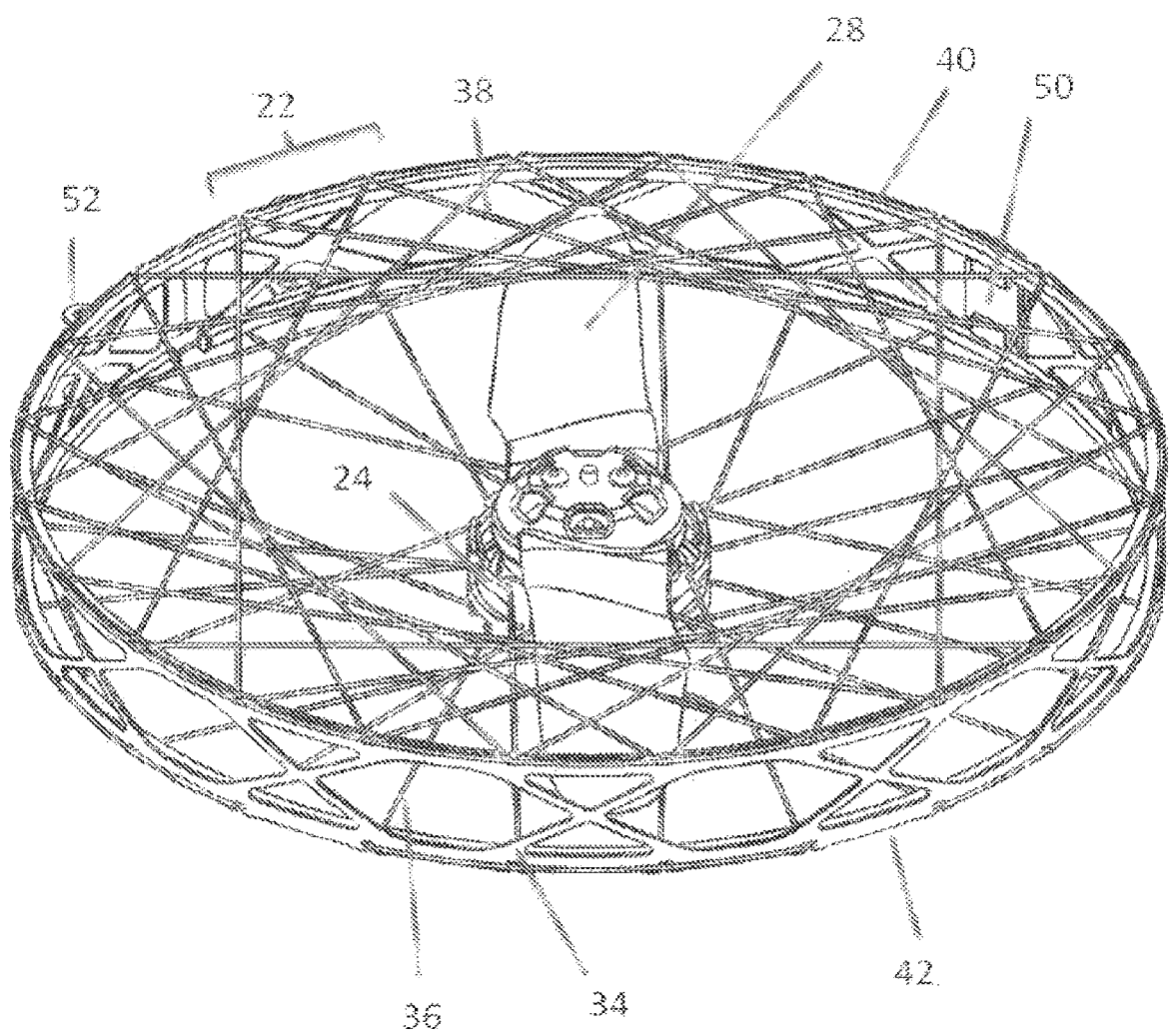
FIG. 4 is a perspective view of one of the four thrust pods, showing details of the central motor, the propeller, a circular peripheral support ring, lower motor-support filaments and upper guard filaments.
Figure 6:
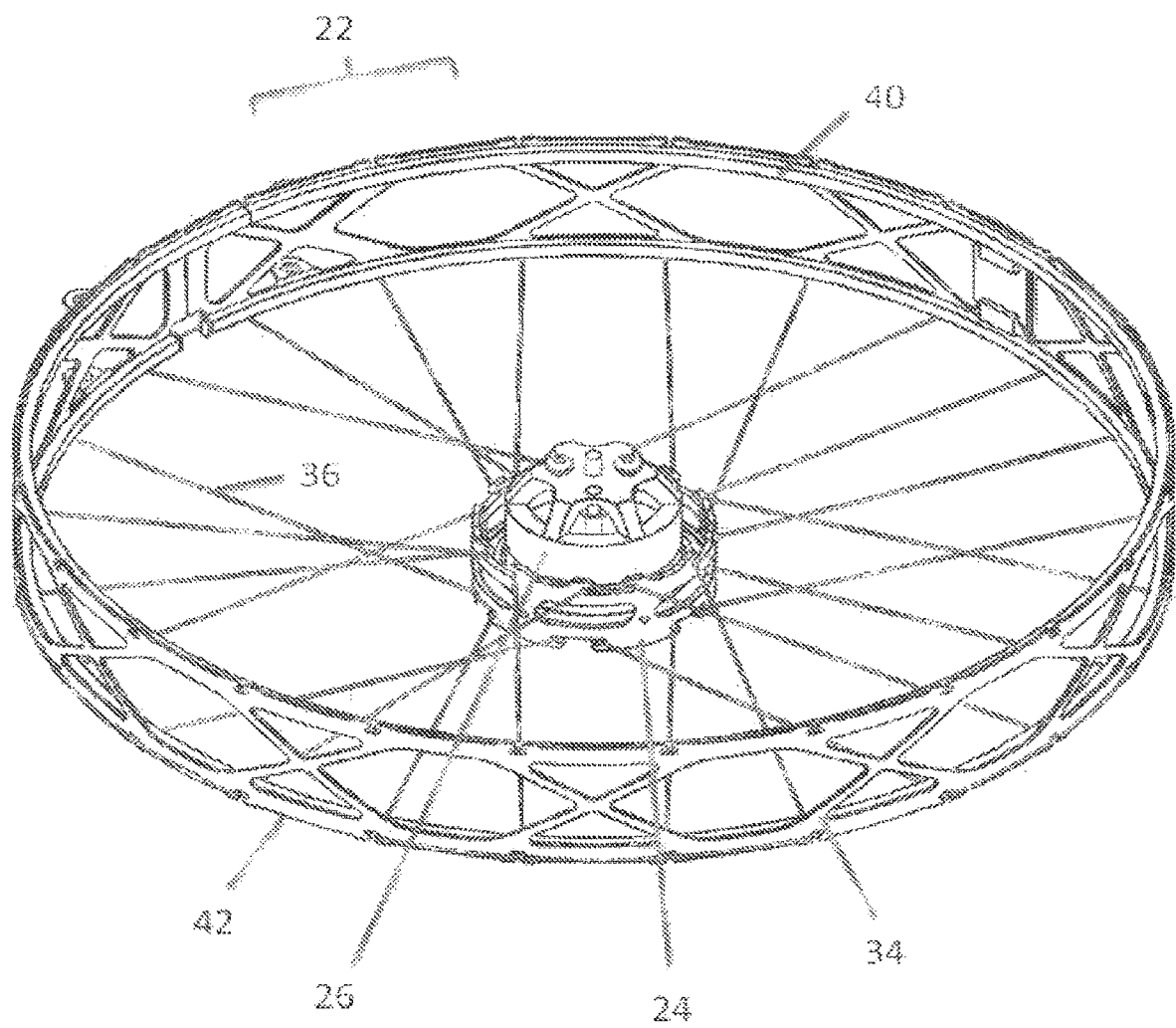
FIG. 6 is a perspective view of the thrust pod of FIG. 5, with the central motor in place.
Figure 7:
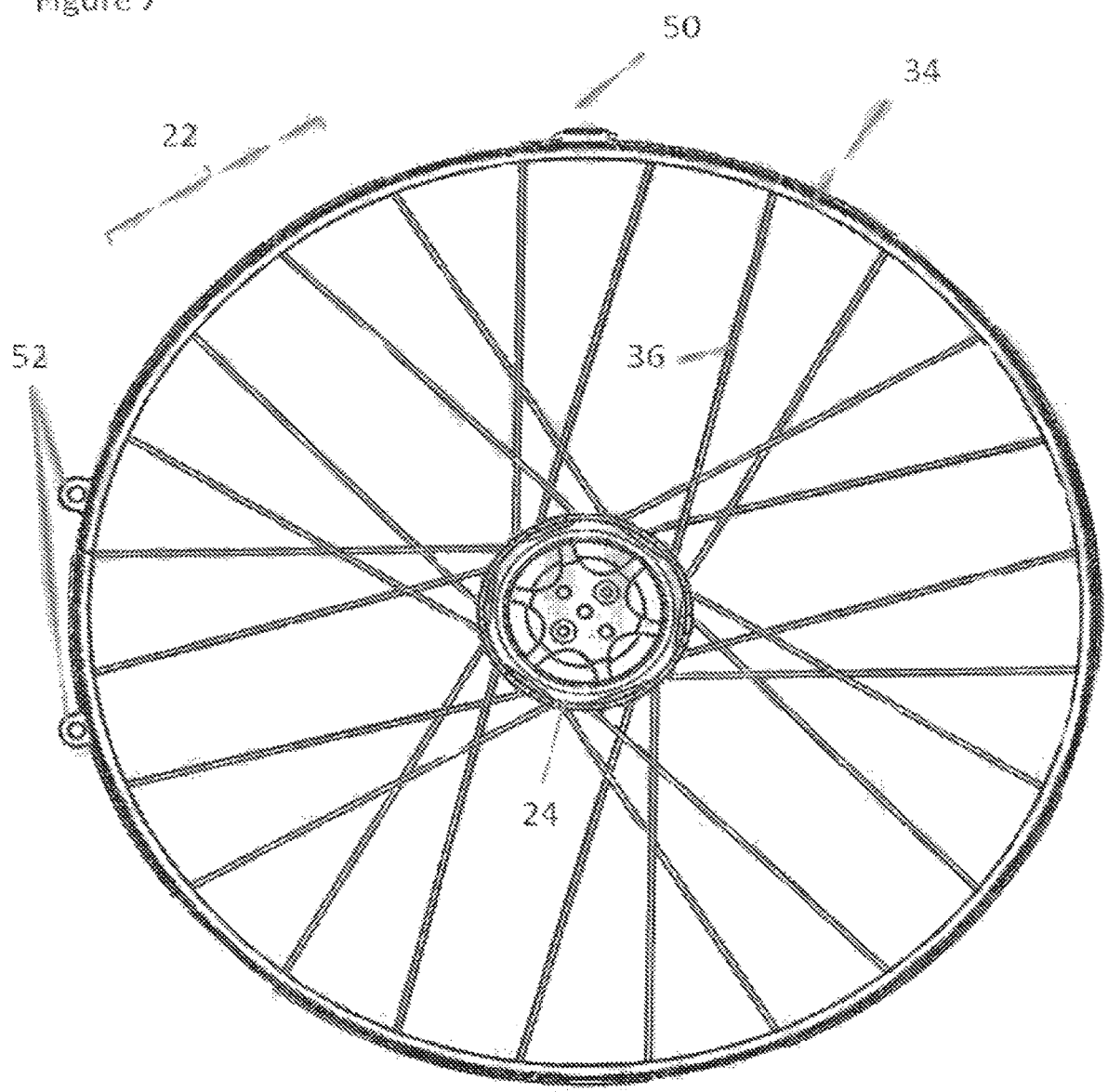
FIG. 7 is a plan top view of the thrust pod of FIG. 6.
Figure 19:
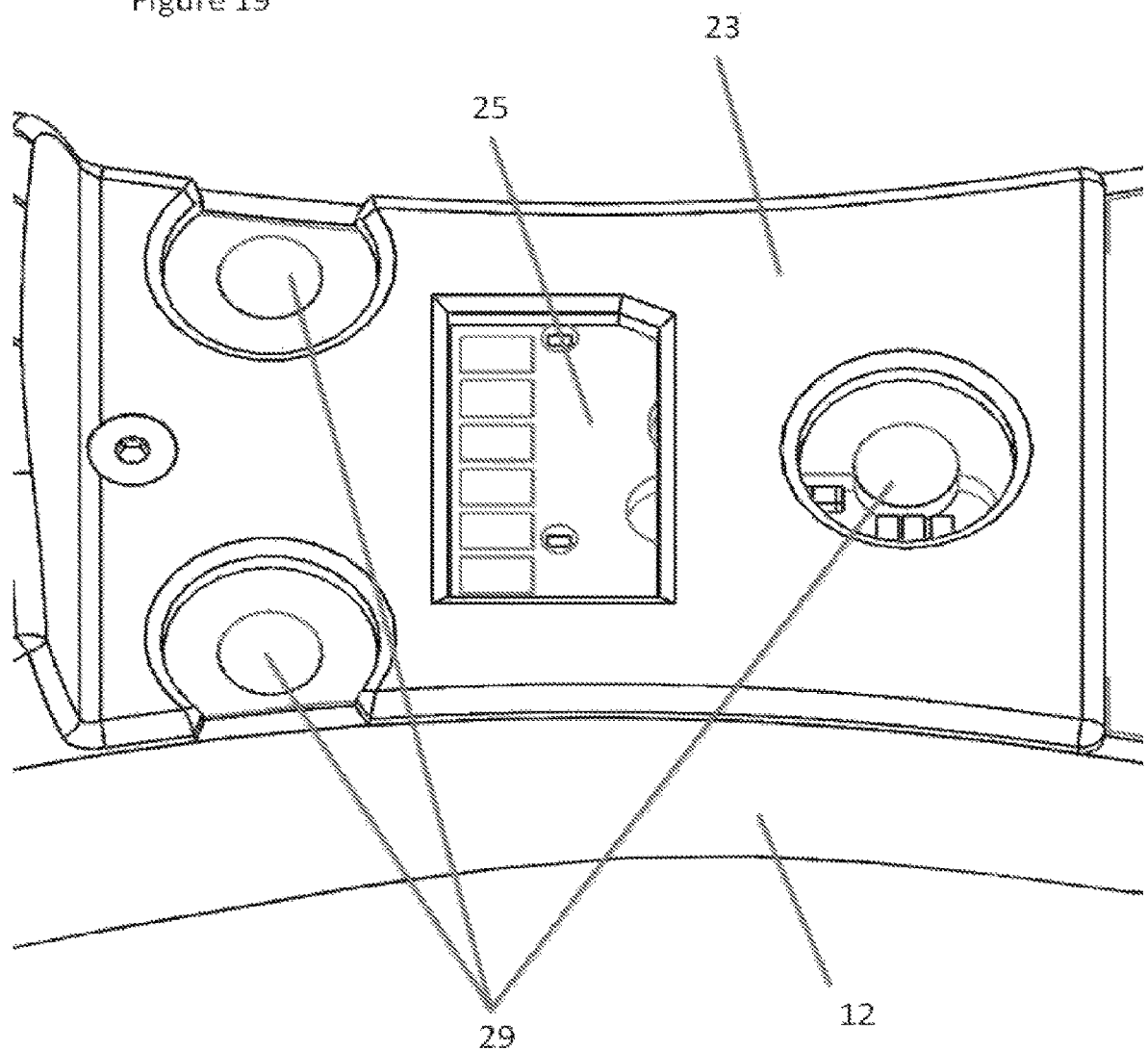
FIG. 19 is an enlarged view of a portion of the underside of the body of the UAV, showing details of securement magnets and electrical contacts that connect with a bridge support of a pod assembly.
Figure 20:
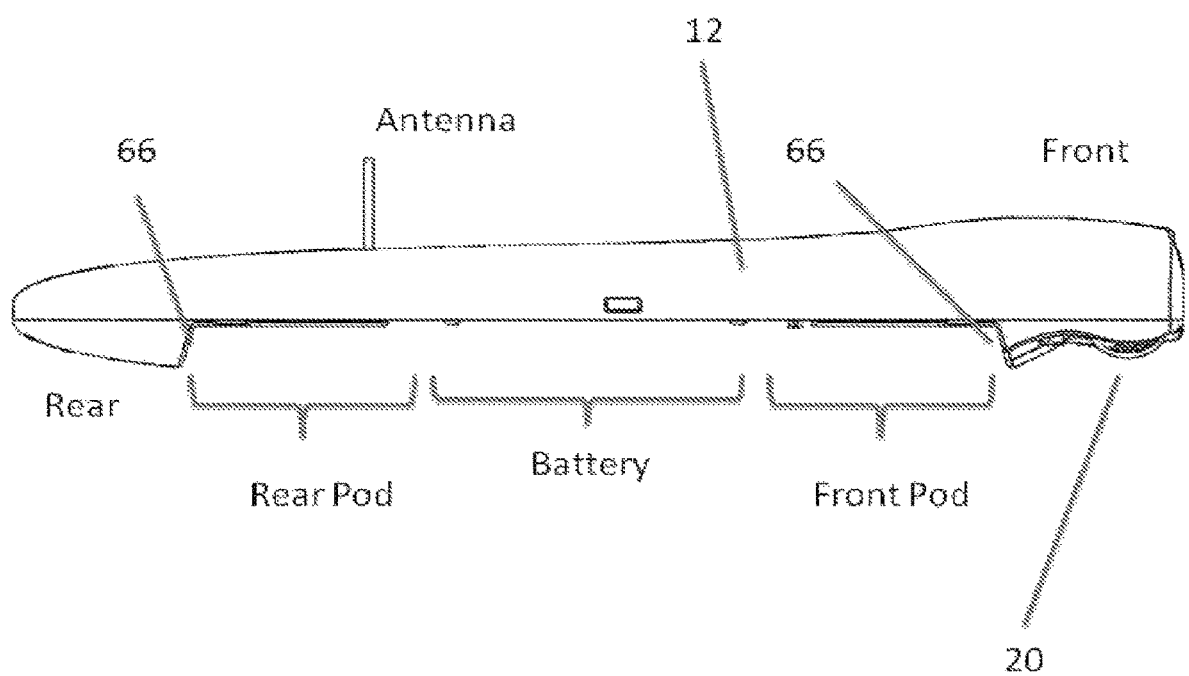
FIG. 20 is an elevation view of the body, shown without the battery or either the front or rear pod assembly.
Figure 21:
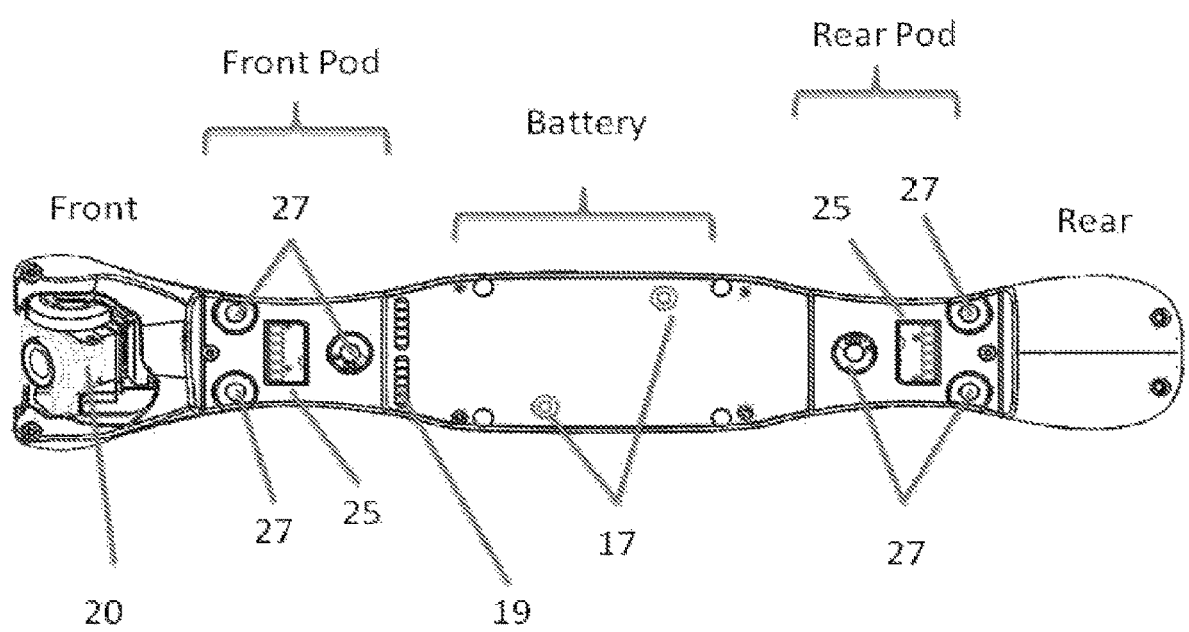
FIG. 21 is a lower plan view of the body, shown without the battery or either the front or rear pod assembly and showing magnet and electrical contact details.
Figure 22:
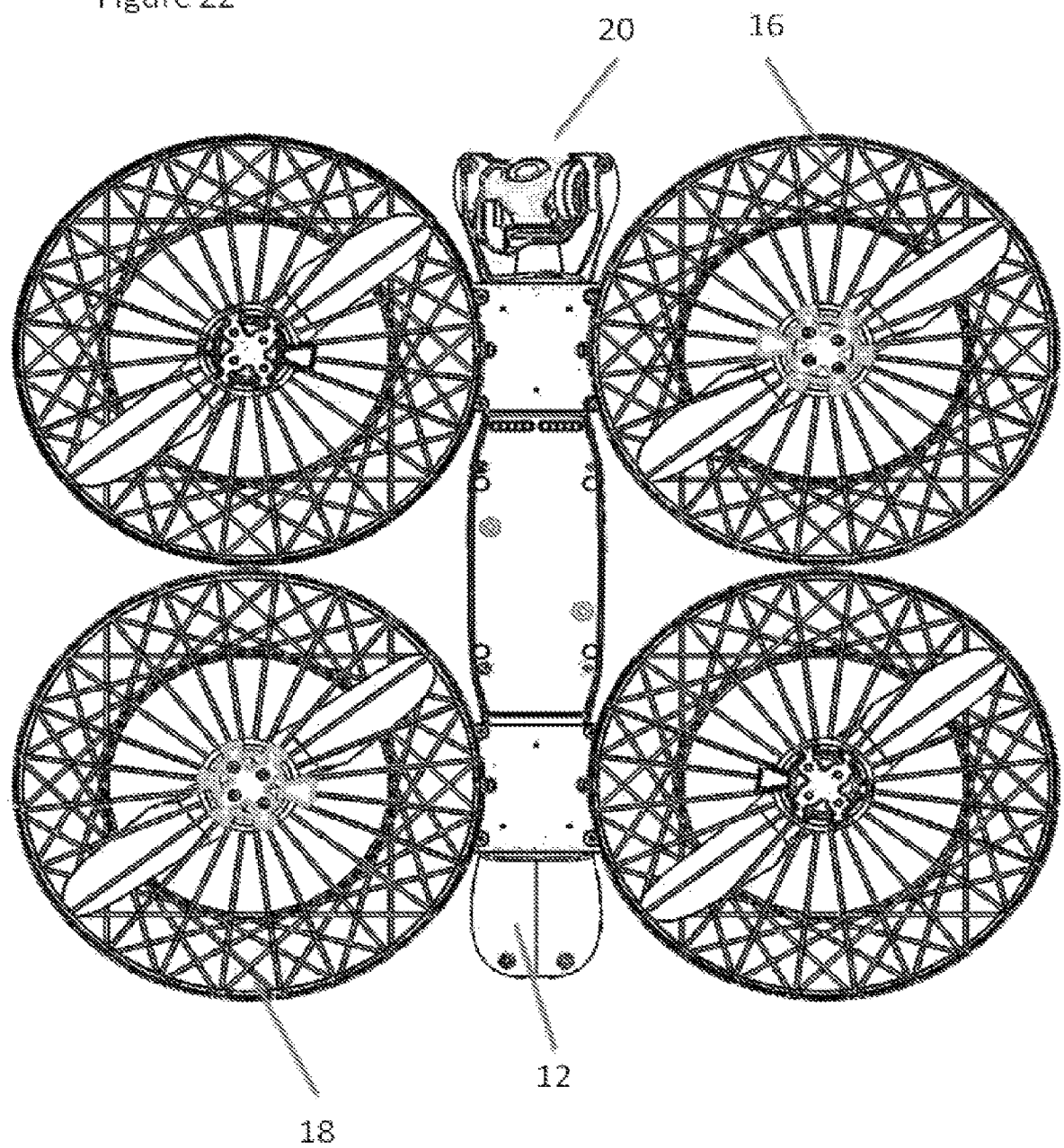
FIG. 22 is a lower plan view of the body, showing the front and rear pod assemblies engaged, but shown without the battery.
Figure 23:
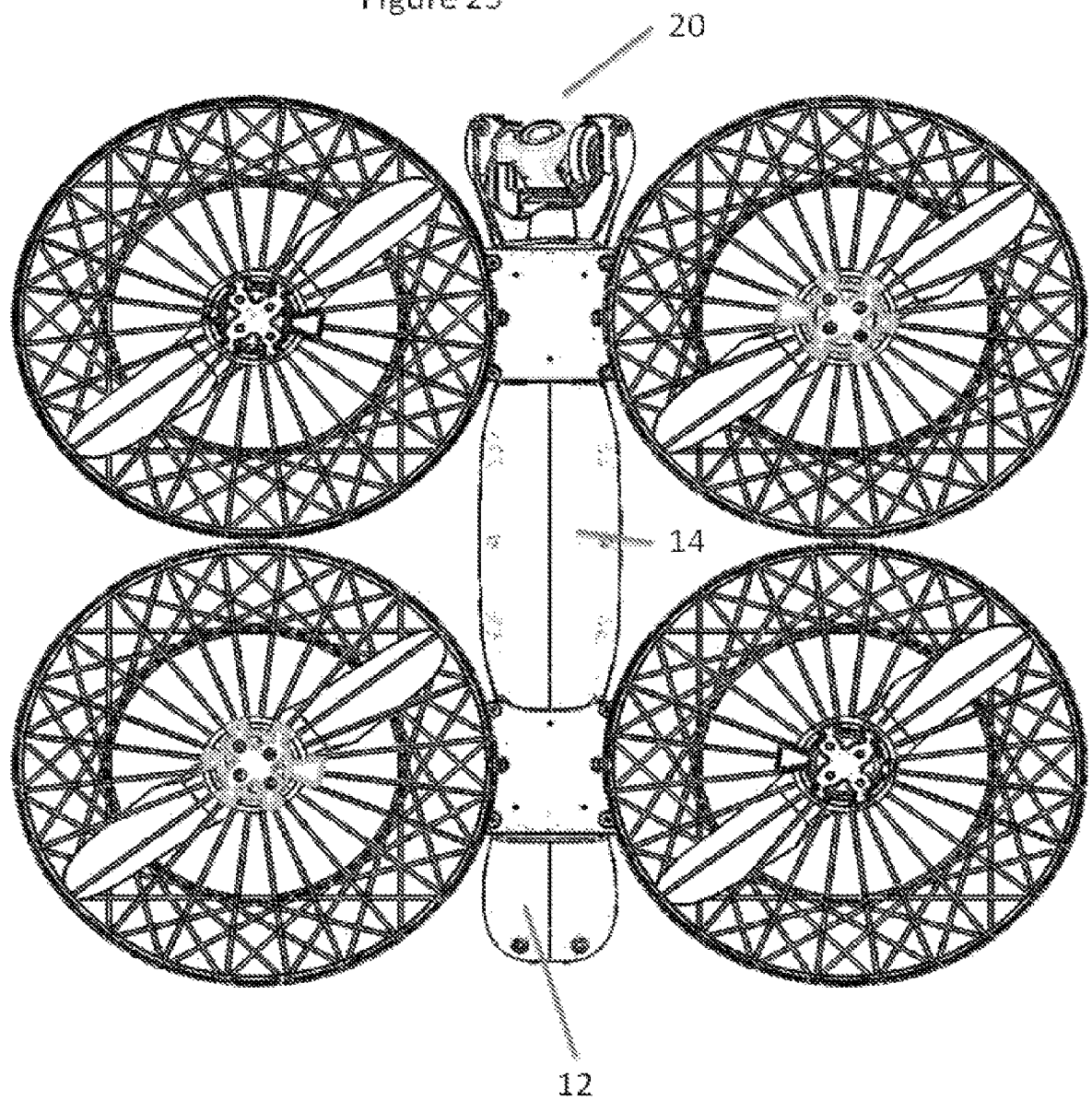
FIG. 23 is a lower plan view of the body, showing the front and rear pod assemblies and the battery engaged.
Figure 24:
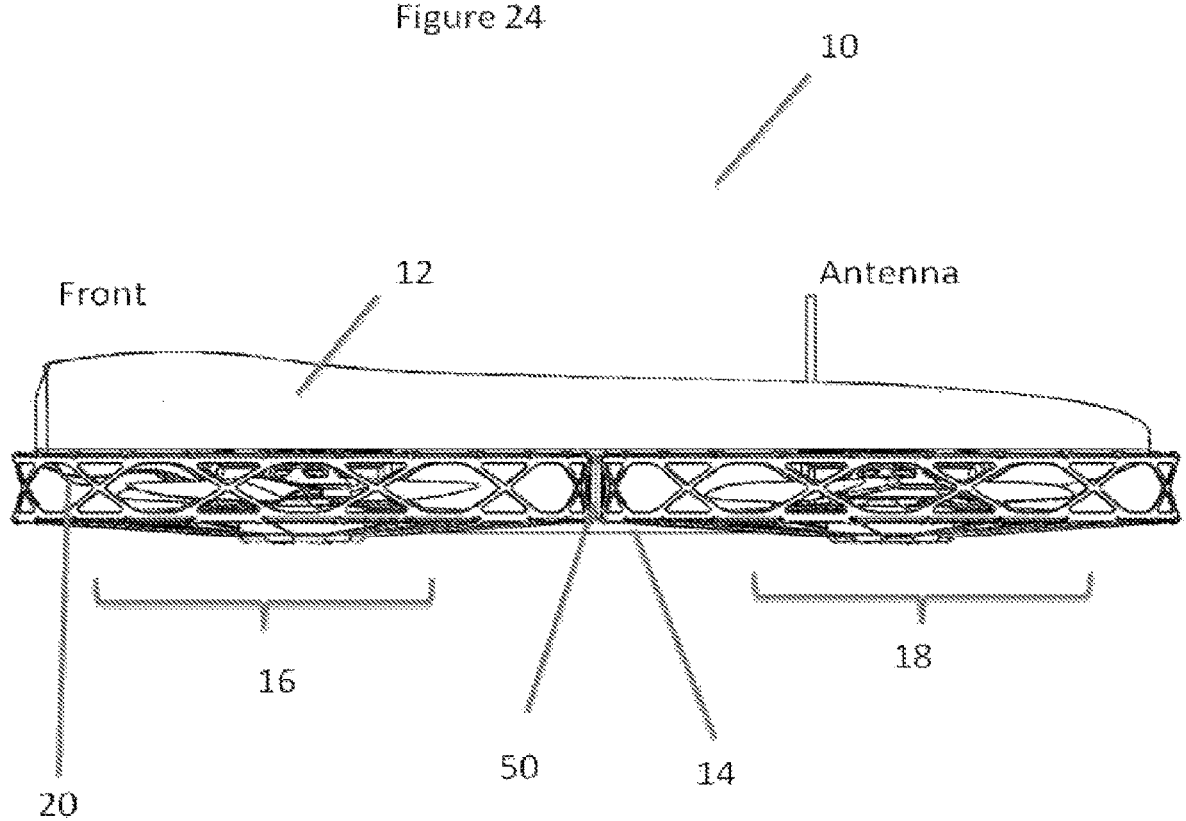
FIG. 24 is an elevation view of a fully assembled UAV.
Figure 25:
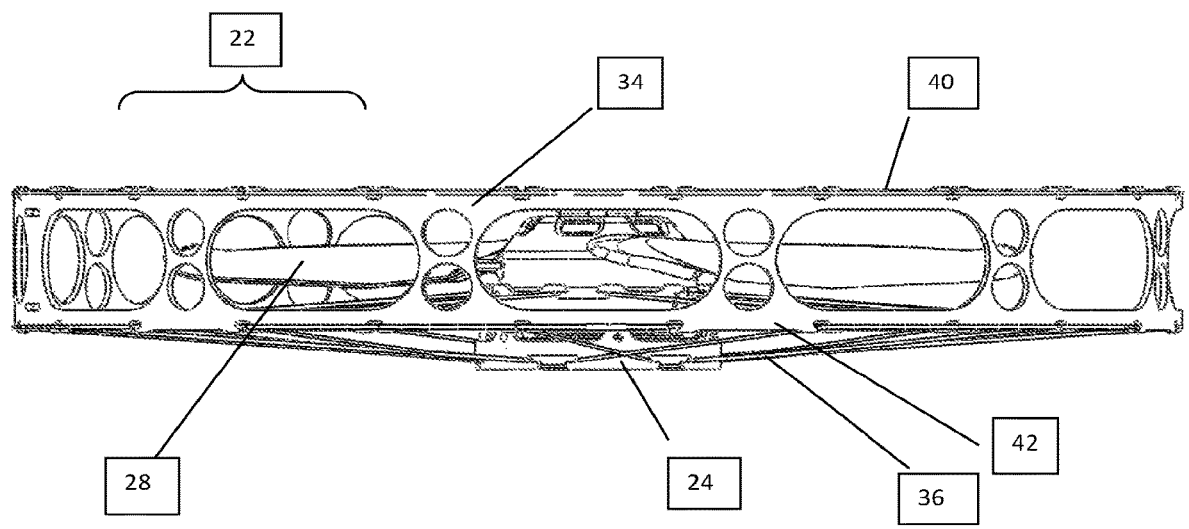
FIG. 25 is an elevation view of a thrust pod showing the motor, propeller, peripheral support ring, and upper and lower support filaments.

In some embodiments, front and rear pod assemblies, 16 and 18, can be almost identical in construction, but mirror opposites. In other embodiments, front and rear pod assemblies 16 and 18 can be identical to one another, but oriented in opposite directions. In still other embodiments, the design of front and rear assemblies 16 and 18 can be different from one another. Each pod assembly includes two thrust pods 22, connected by a bridge support 23. Bridge support 23 includes electrical connections 25 and mechanical connections such as magnets 27. Magnets 27 of bridge support 23 can be aligned with magnets 29 located on the underside of body 12, as shown in FIGS. 19, 21, and 22, to releasably secure the front and rear pod assemblies 16 and 18 to the body 12. Magnets 27 and 29 selectively secure each front and rear pod assemblies 16, 18 to the underside of body 12 at their prescribed locations, as shown in FIGS. 20 and 21, similar to how magnets on the battery pack hold battery pack 14 to body 12, described above. As shown in FIGS. 4 and 6, each thrust pod 22 can include a central hub 24, a central motor 26, a propeller 28, and a propeller guard assembly 30.

d) Motor

In some embodiments, UAV 10 can be powered by four electric motors 26, each driving one of four propellers 28. To help cancel out any rotational torque effects, two of the four propellers can have right hand pitch and the remaining two have left hand pitch. Each motor 26 is mounted to a central hub 24. Electrical wires 32 connect each motor 26 to the controlling electronics which can be located within body 12 (not shown).

e) Propeller Guards

Figure 8:
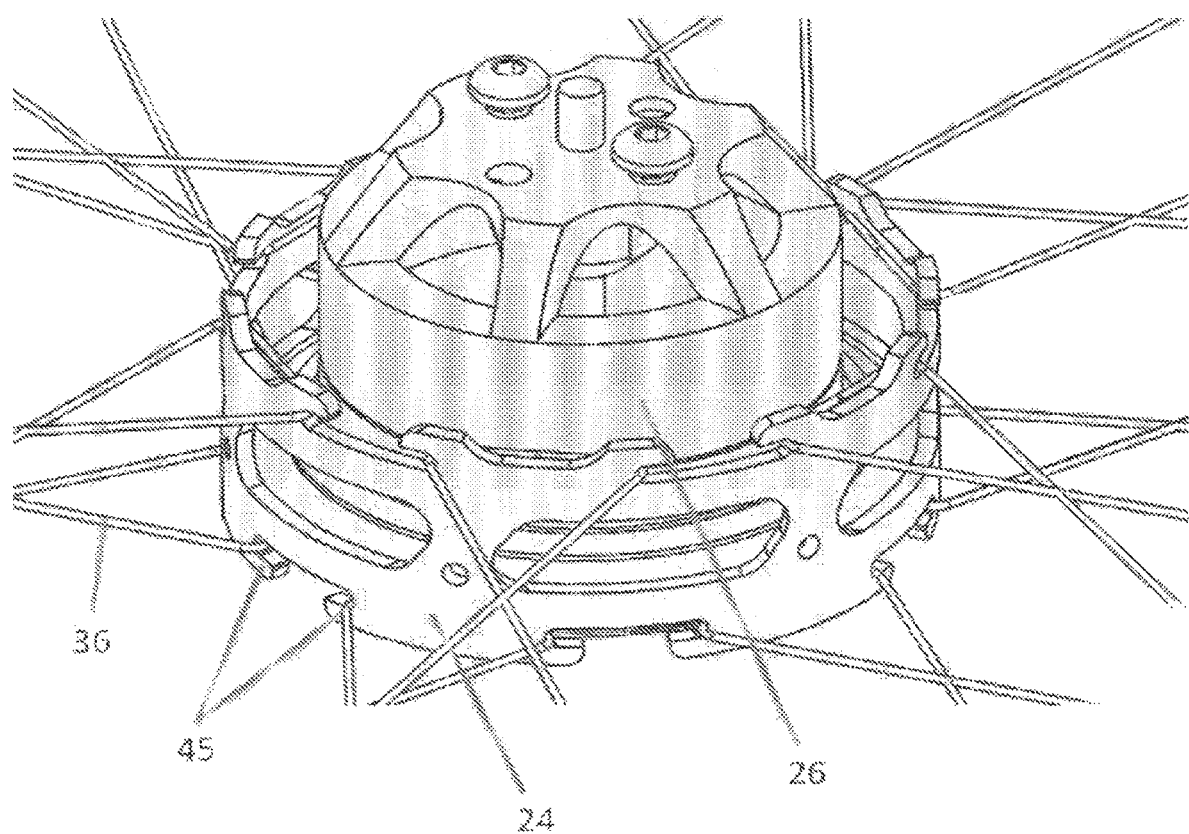
FIG. 8 is a perspective view of a portion of the thrust pod of FIG. 6, showing details of the engagement between the central hub and the lower motor-support filaments.
Figure 9:
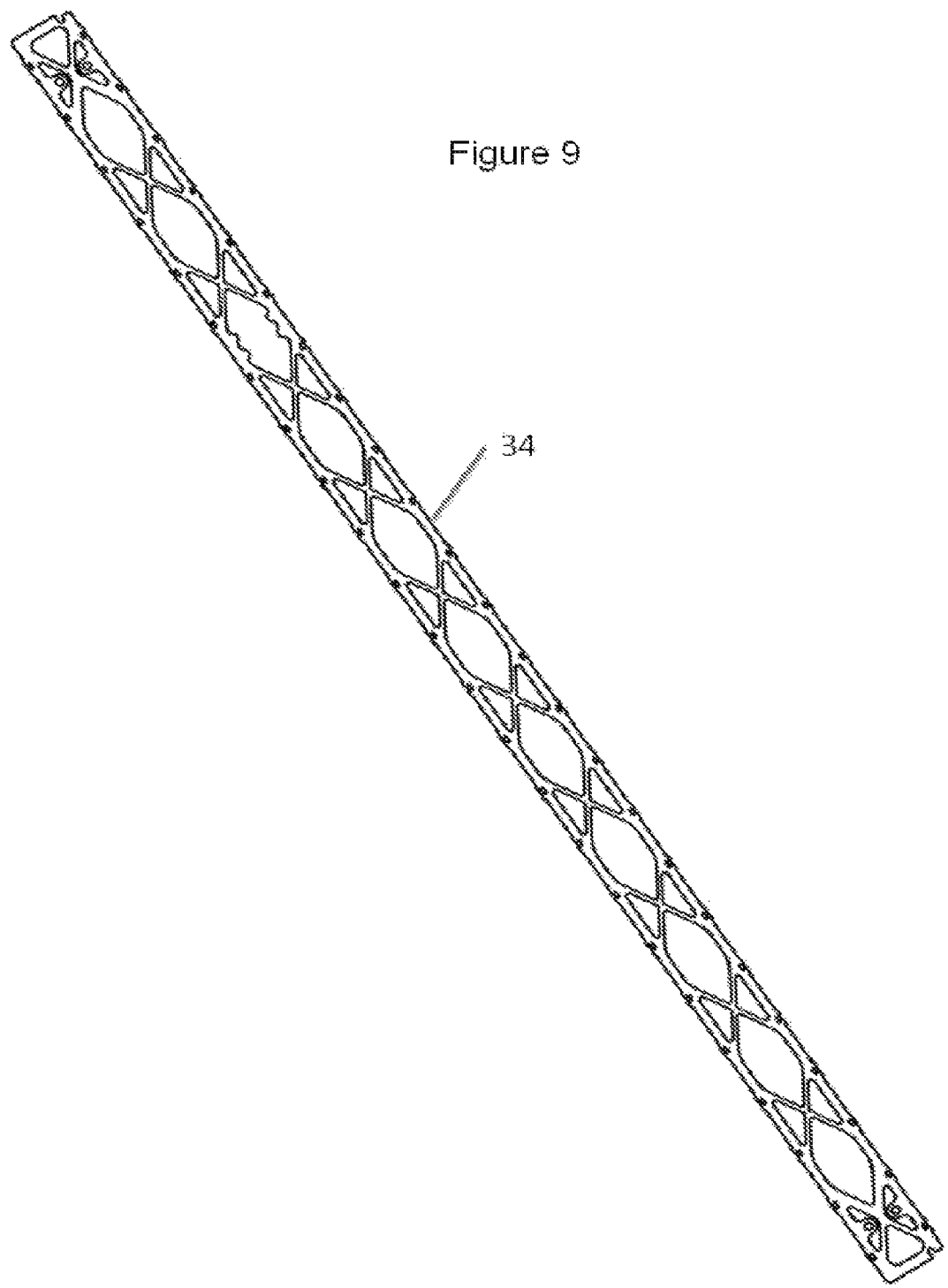
FIG. 9 is a side view of the circular peripheral support ring laid out flat, prior to being formed to a circular shape.

Each propeller guard assembly 30 includes a circular peripheral support ring 34, lower motor-support filaments 36, and upper guard filaments 38. As shown in FIGS. 8 and 9, each support ring 34 can be made from a strong lightweight material, and can be either molded as a three dimensional shape, or assembled to a three dimensional structure from a thin strip of material. In some embodiments, each support ring 34 can be formed from or include a thin strong alloy of aluminum that has been cut to remove unnecessary material, leaving a lightweight and strong circular ring structure, as shown in FIGS. 4-9. The cutting process can be performed by any suitably precise cutting process, such as by laser, waterjet or milling machine. Once cut, the ends of each strip are secured to each other, thereby forming a circular structure having an upper rim 40 (defining an upper plane) and a lower rim 42 (defining a lower plane).

Support ring 34 outer can be made from a wide range of materials, but given the constraints of flying aircraft, some embodiments use high strength to weight materials including, but not limited to, carbon fiber composites, aluminum alloys (such as 6061 T6 aluminum), or titanium alloys. Since the support ring structure primarily experiences compressive loading, once assembled with the support filaments in place, in addition to lesser torsional and shear loads, materials with high strength are preferred in some embodiments.

One suitable method for making support ring 34 is to cut or stamp the desired shape from a flat sheet and the bend the material around a form to create a cylindrical ring structure. By using a malleable material that can be easily bent and stamped, such as aluminum or titanium, it is possible stamp to detail into the stock substrate and then later deform and bend specific integrally formed features to create components extending at least partially radially outward from or inward into the ring structure. For example, mounting tabs 52, shown in FIG. 4 as a feature extending radially inward from the primary surface of support ring 34, can be easily formed by first stamping the tab shapes into the flat stock material, as shown in FIGS. 9 and 10, and thereafter bending the stamped tab features 90 degrees to form the inwardly-extending mounting tabs 52.

Figure 5:
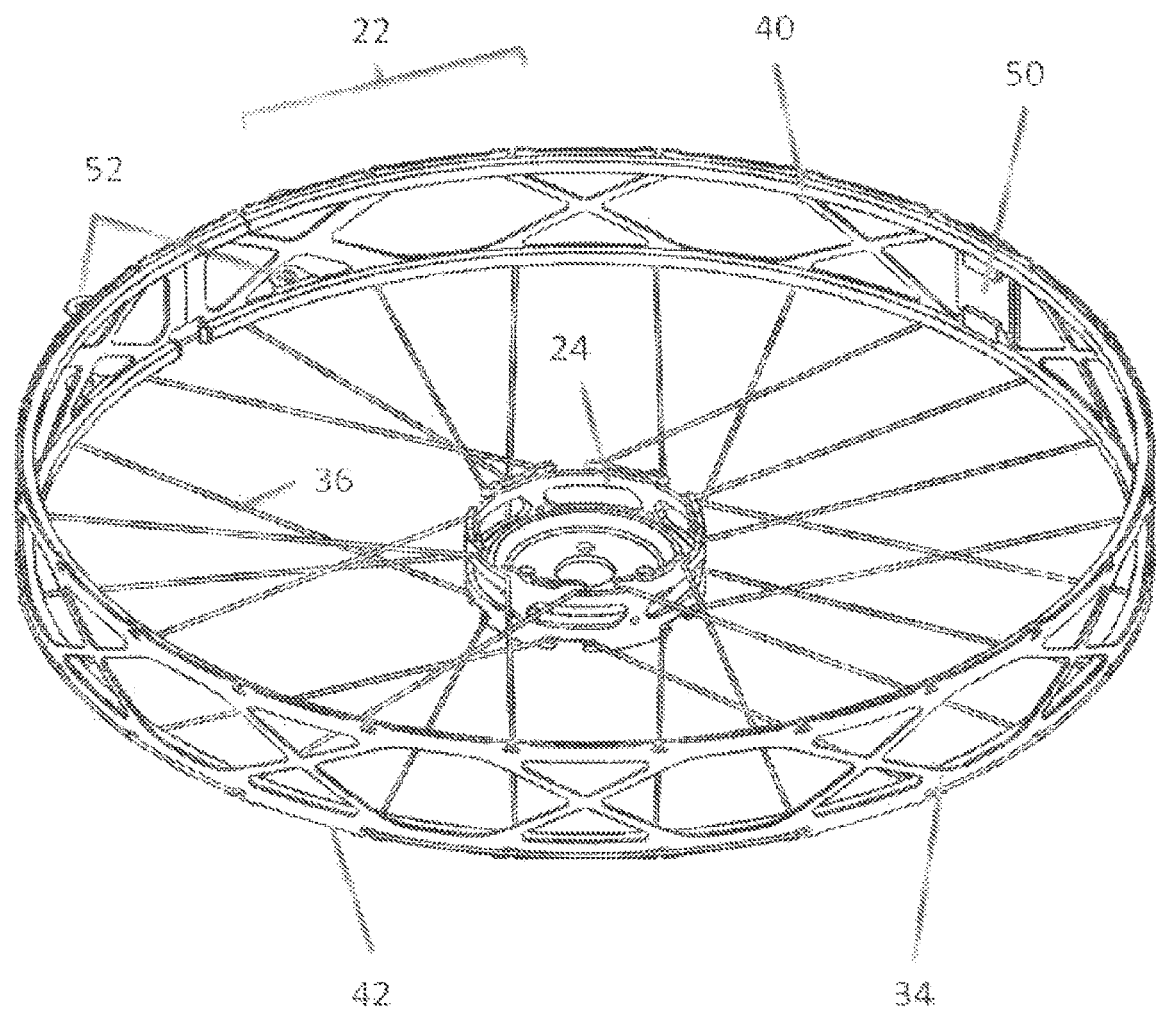
FIG. 5 is a perspective view of the thrust pod of FIG. 4, with the upper guard filaments and central motor removed showing details of the lower motor-support filaments.
Figure 10:
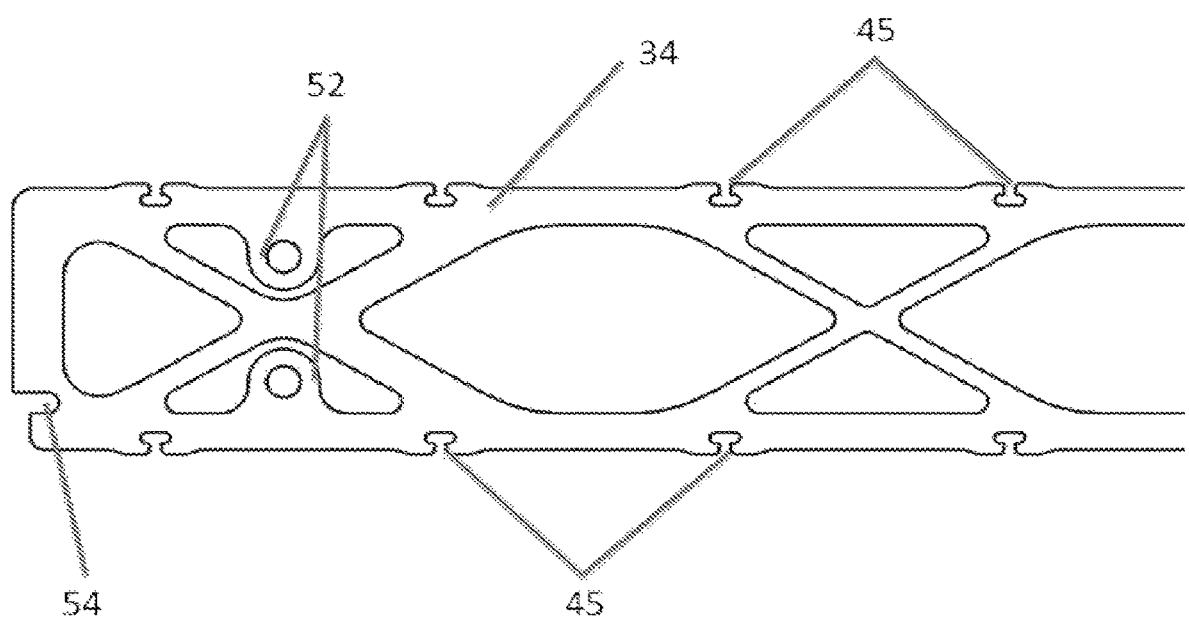
FIG. 10 is a close-up side view of the circular peripheral support ring of FIG. 9, showing details of filament engagement hooks and pod-mounting tabs, the tabs being shown prior to being bent to their final shape.

As shown in FIGS. 5, 6 and 10, each support ring 34 can additionally include integrally-formed features such as coplanar hooks 45 that are sized and shaped to receive and hold upper and lower support filaments, as explained in greater detail below.

As discussed in greater detail below, the motor-support filaments 36 provide an inwardly-extending protective structure below the swept space through which the blade or blades of propeller 28 rotates, and upper guard filaments 38 provide an inwardly-extending protective structure above the swept space through which the blade or blades of propeller 28 rotates. The motor support filaments 36, upper guard filaments, and support ring 34 together provide guards adjacent each propeller that protect the propeller from accidental object-engagement at the sides, top and bottom of the propeller plane. In addition, these propeller guards mitigate interference with the performance characteristics of the propeller.

f) Reinforcing Features of Support Rings

The upper rim 40 and lower rim 42 of support ring 34 will experience strong forces from the collective tension of the filaments, pulling the ring inwardly. Therefore, in some embodiments, structural features can be used to reinforce support ring 34 in these regions to improve strength and durability of thrust pods 22. These reinforcing structures can be formed or provided in a number of ways, including, but not limited to, providing inwardly or outwardly bent tabs to the ring-structure itself or by attaching circular hoops 53 to the inside surface of support ring 34 at one or both of upper rim 40 and lower rim 42. In order to maximize the strength to the support ring, these added reinforcements can be positioned as close as possible to where the filaments 36 contact support ring 34.

When additional components are used to reinforce support ring 34, these components can include or be formed from a number of possible materials exist, including, but not limited to pultruded carbon-fiber composite, aluminum, or titanium, whether alone or in combination with other materials. In some embodiments, pultruded carbon-fiber or unidirectional carbon fiber composite shaped to conform to the curve of support ring 34 can be used, due to the high strength to weight ratio of the carbon-fiber, good fiber orientation for the compressive loads, and comparatively low cost in comparison to woven carbon.

When fabricating reinforcement hoops 53 using carbon-fiber based materials, several layers of the material can be shaped to the desired circular shape prior to bonding the layers together, to prevent or minimize the formation of internal stress which can weaken the final ring form. Once formed, these reinforcing hoops 53 can be attached to the upper and lower rims of support ring 34 in a number of possible ways including, but not limited to, adhesives and mechanical fasteners, or combinations thereof. One method of mechanically fastening reinforcing hoops 53 to upper rim 40 and lower rim 42 is to provide integrally formed tabs in support ring 34 that are sized and shaped to allow mechanical capture of hoop 53 by deforming each tab around hoop 53. Alternatively, a lacing material, such as Kevlar® thread, can be wrapped around the reinforcing ring and the rim to tie or stitch the hoop to support ring 34.

g) Support Rings

As mentioned above, support rings 34 can in some embodiments be made as strong and lightweight as possible. To help reduce weight, specific regions of each support ring can be removed in the stamping or machining process. These areas that are removed can be carefully designed to reduce weight of support ring 34, but maintain the ring's structural strength. Other benefits to removing select regions within support ring 34 include reducing wind drag and turbulence exerted on the adjacent spinning propeller 28, caused from wind in the propeller's air flow. A variety of cutout shapes are possible, but cutout shapes that form a truss-structure within the support ring 34 can be very effective at reducing weight while maintaining strength. The truss-structure appears as a plurality of adjacent "X" s, as illustrated in FIGS. 4, 5, and 6.

h) Filament/Spokes

In some embodiments, the central hub 24 is held centrally within support ring 34 using a continuous length of filament 36. The continuous length of filament can laced or threaded back and forth between hooks 45 formed along upper and lower rims of central hub 24 and hooks 45 formed along lower rim 42 of support ring 34. In some embodiments, this threading can follow a prescribed lacing pattern, and can be done while under a predetermined preferred tension. The resulting filament "spokes" formed between central hub 26 and support ring 34 collectively and evenly hold central hub firmly at the center of the cylindrical support ring 34, as shown in FIGS. 4-6. In some embodiments, the upper rim of central hub 24 can be substantially coplanar with lower rim 42 of support ring 34, as shown in FIGS. 4-6 and 25.

Figure 11:
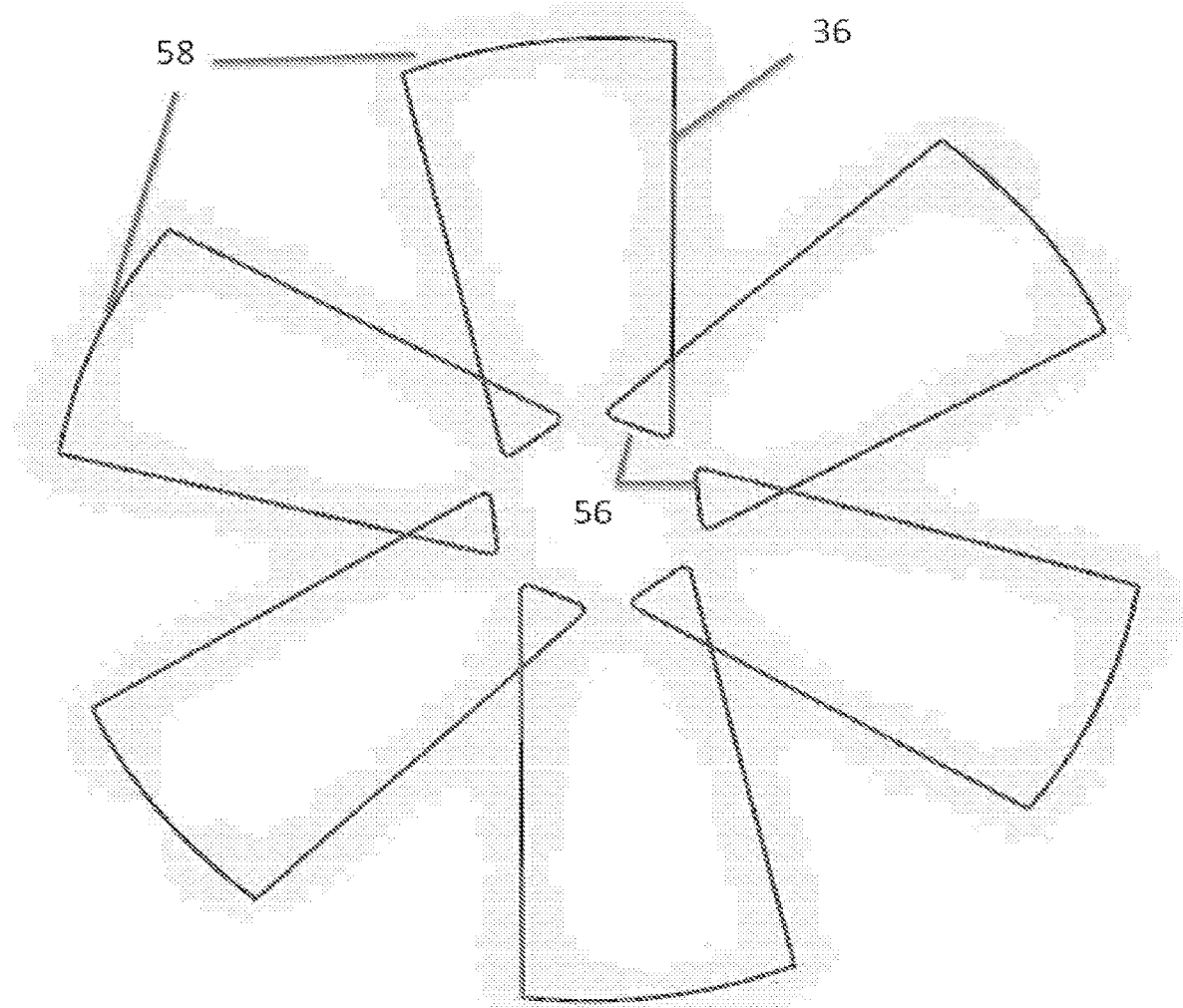
FIG. 11 is a plan view of one set of lower motor-support filaments, showing a first wind-path of the filament between the central hub and the peripheral support ring.
Figure 12:
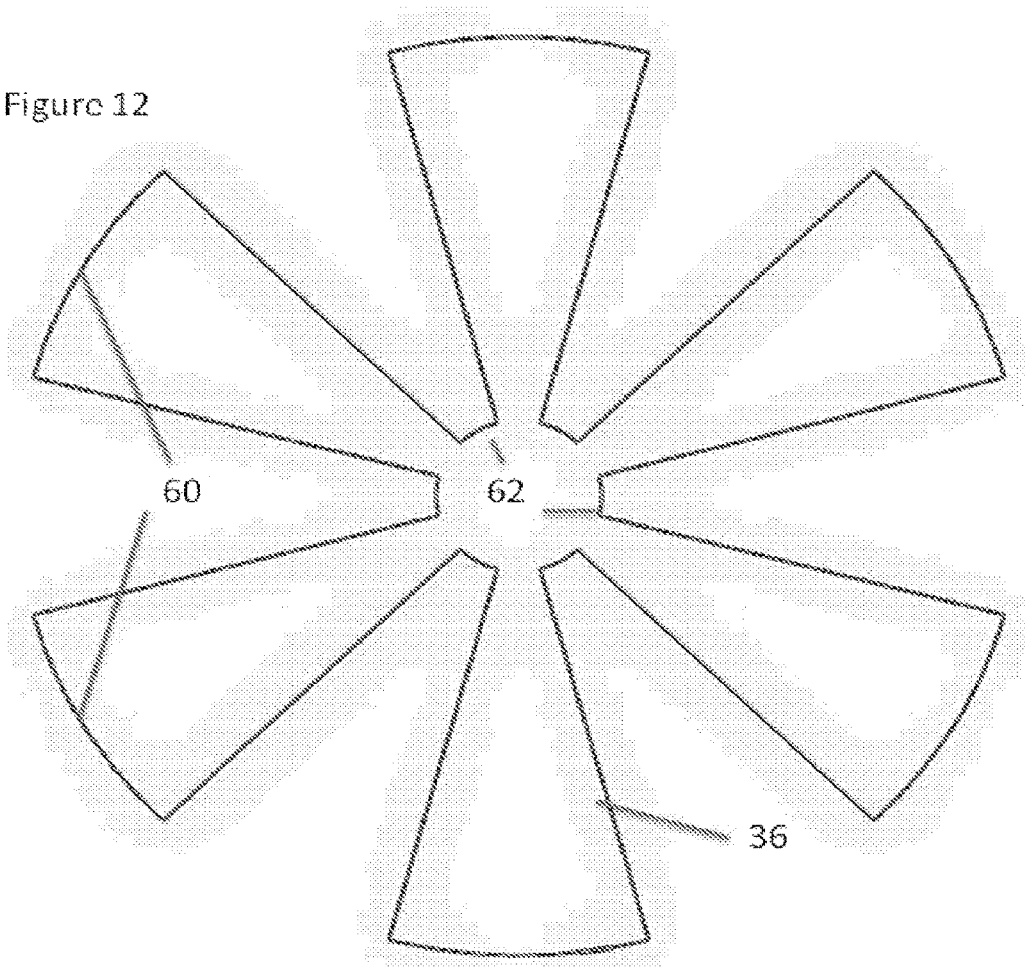
FIG. 12 is a plan view of one set of lower motor-support filaments, showing a second wind-path of the filament between the central hub and the peripheral support ring.
Figure 13:
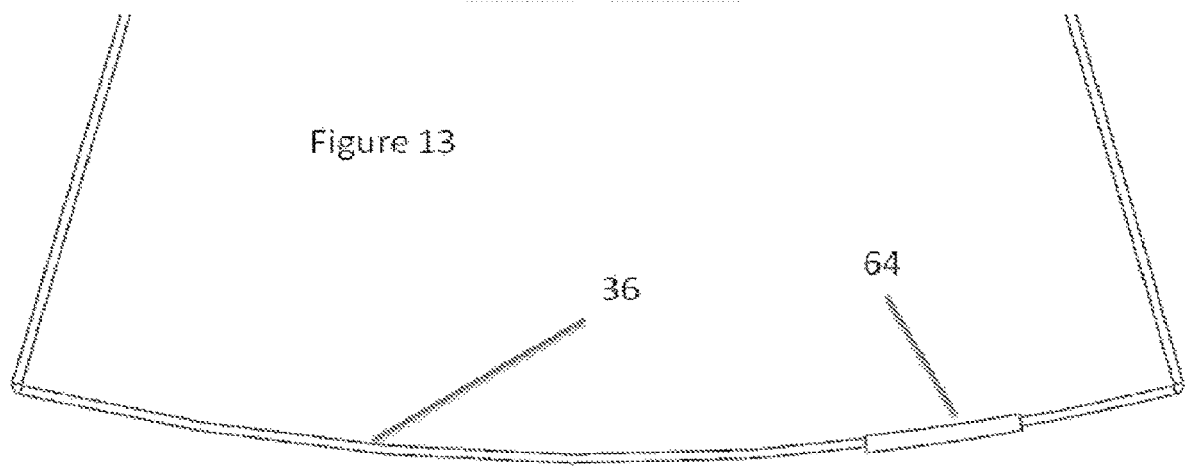
FIG. 13 is an enlarged view of a section of the filament of FIG. 12, showing a connection point where the two open ends of the filament are secured to each other to form a closed loop.
Figure 14:
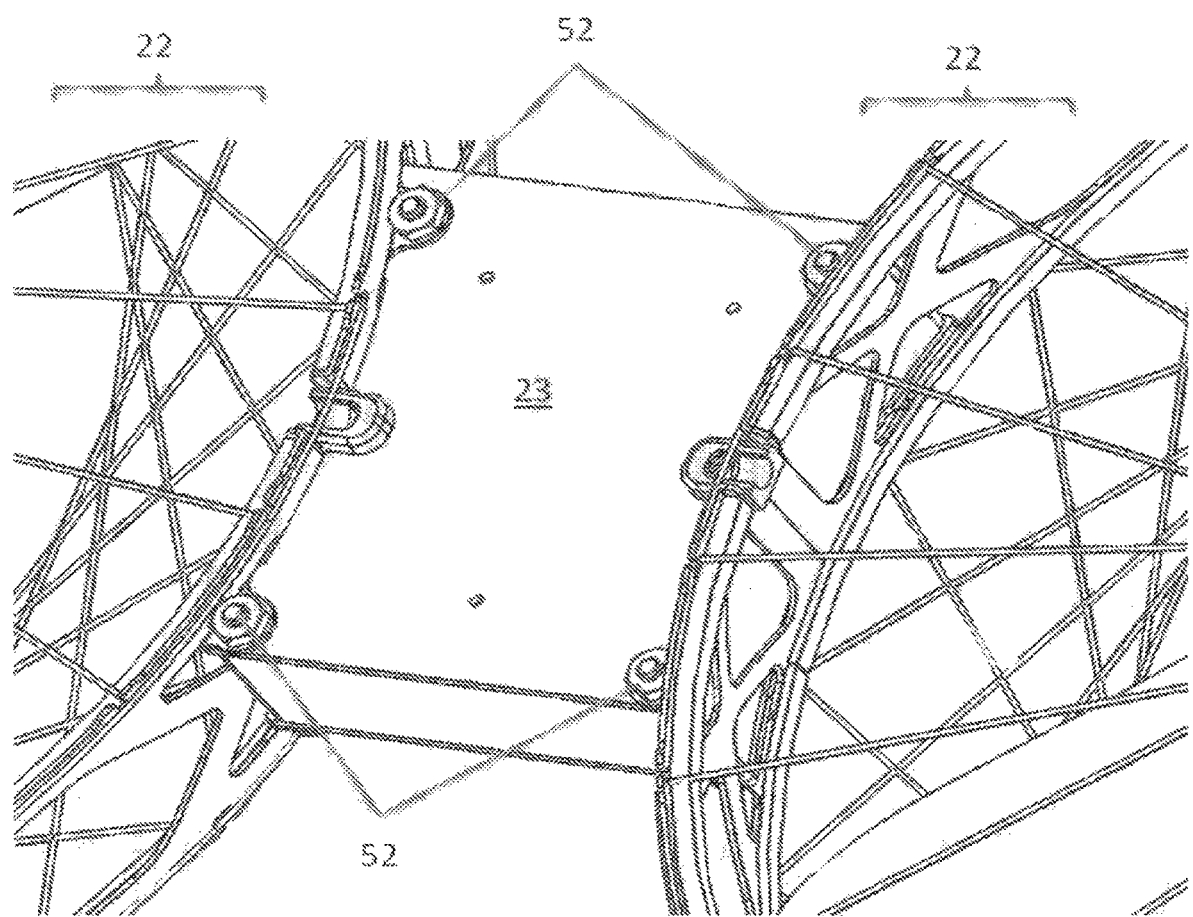
FIG. 14 is a perspective view of a portion of the front pod assembly, showing the lower surface of the bridge support between two thrust pods.
Figure 15:
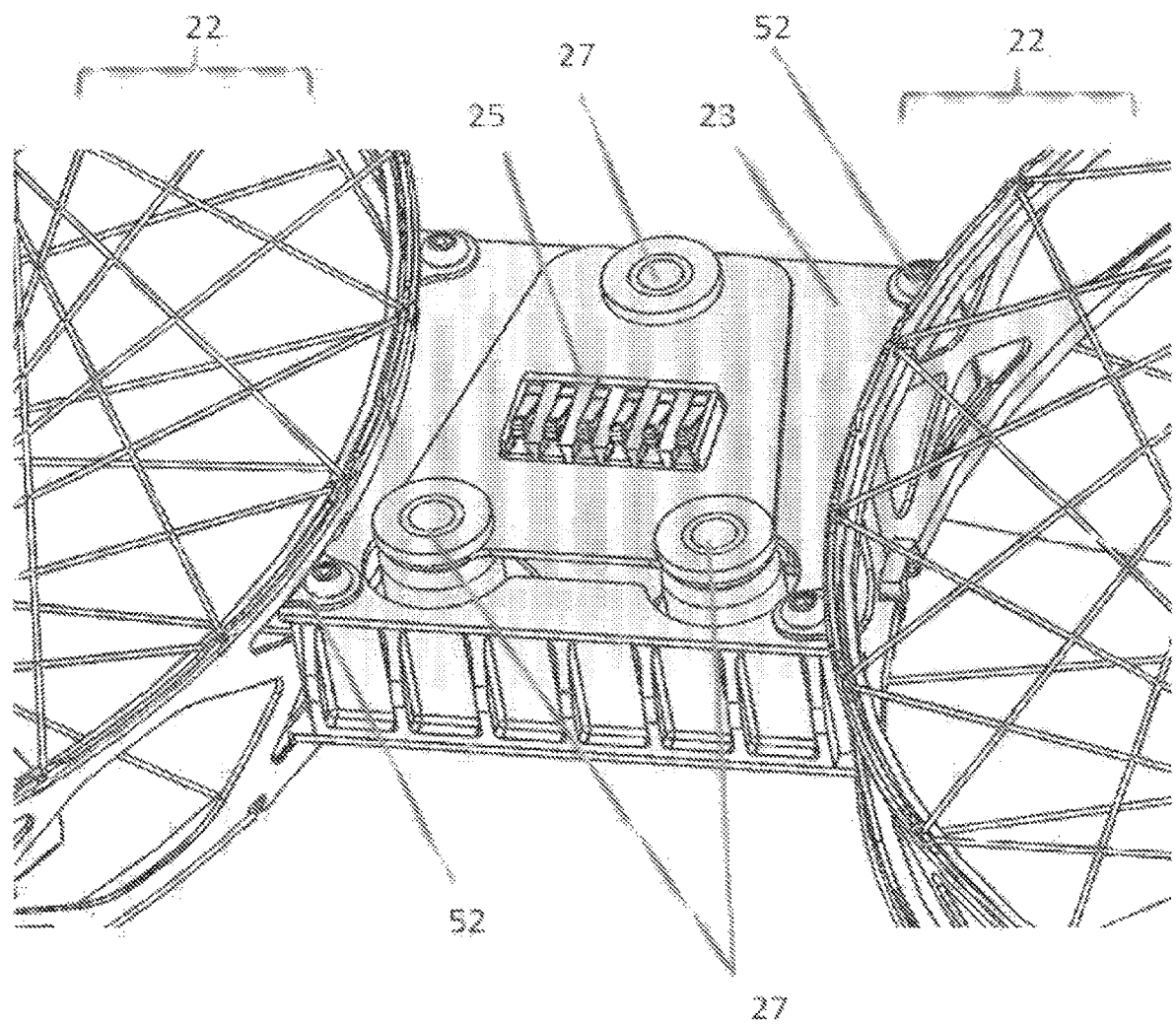
FIG. 15 is a perspective view of a portion of the front pod assembly, showing the upper surface of the bridge support between two thrust pods.
Figure 16:
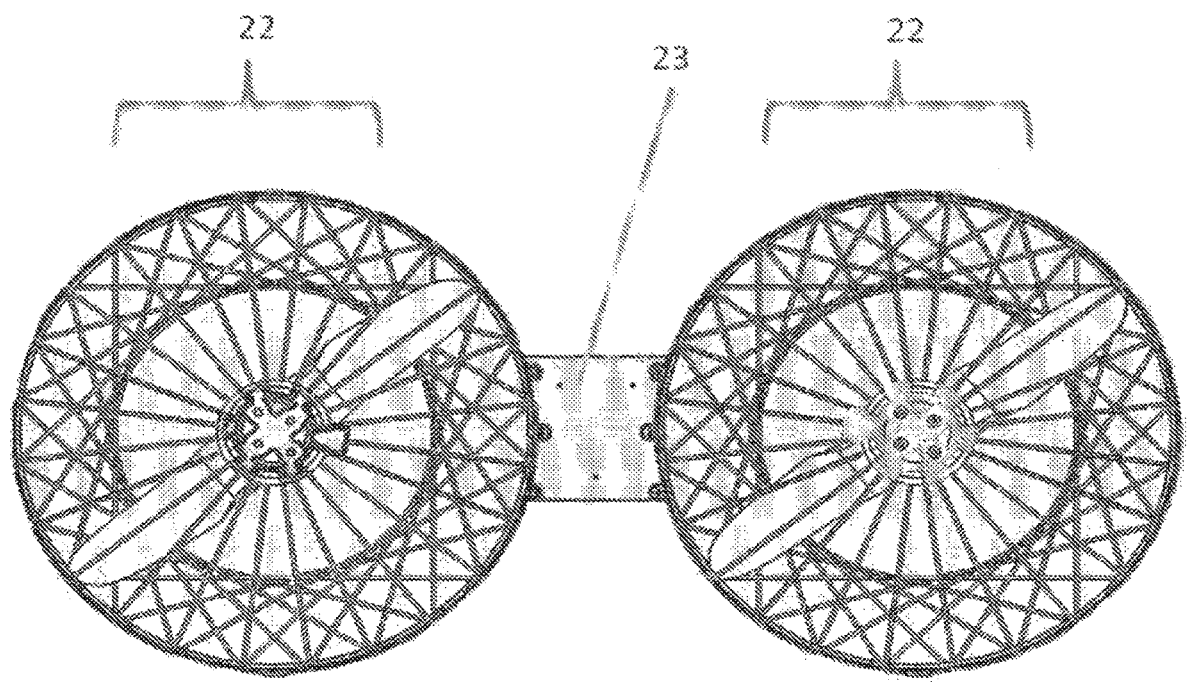
FIG. 16 is a lower plan view of the entire front pod assembly.
Figure 17:
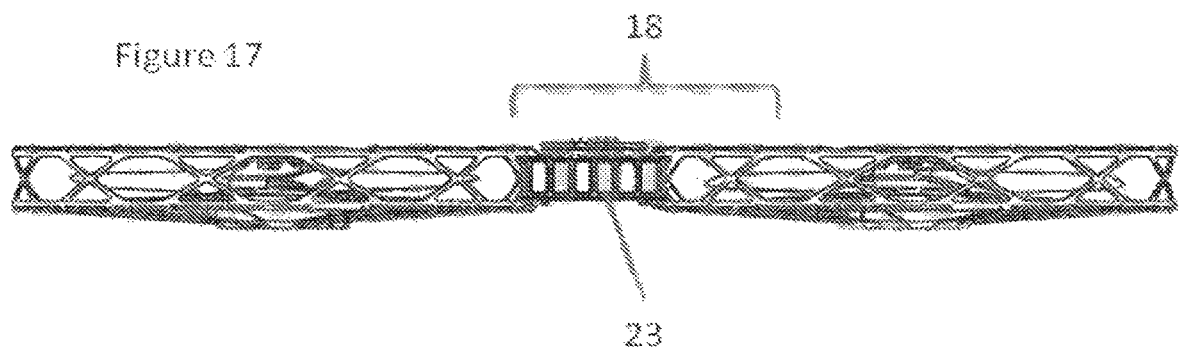
FIG. 17 is an elevation view of the entire front pod assembly.
Figure 18:
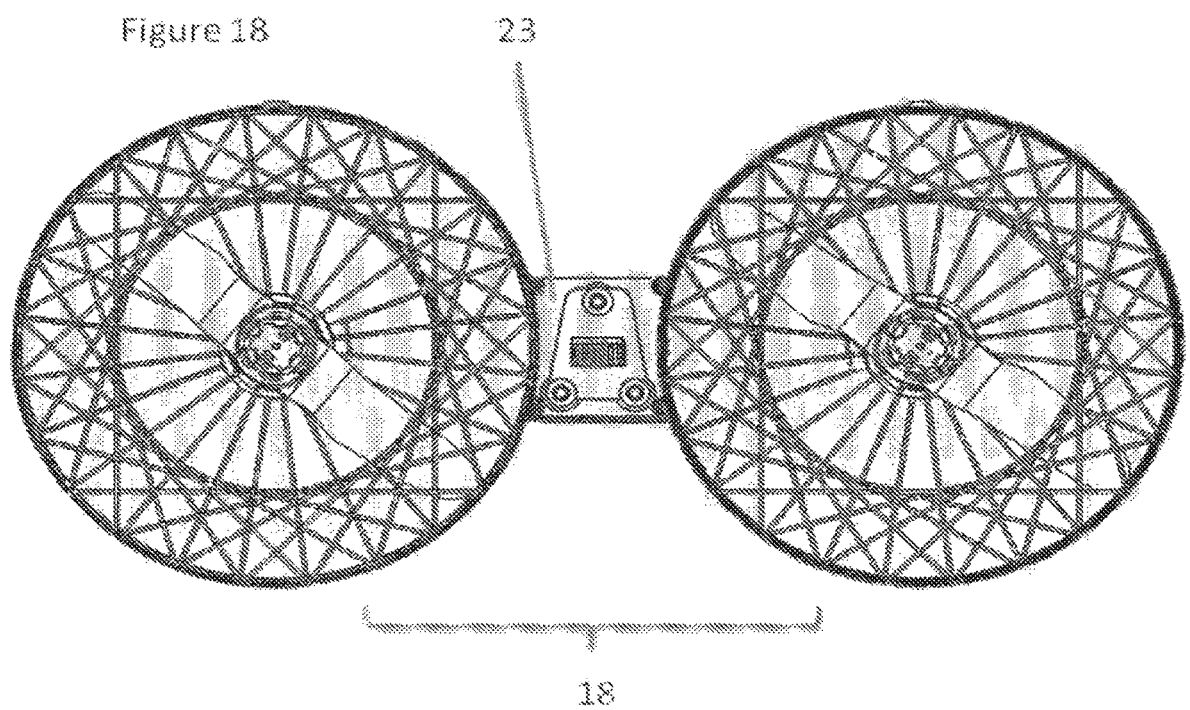
FIG. 18 is an upper plan view of the entire front pod assembly.

One possible lacing pattern is shown in FIG. 11, wherein laced regions 56 show the filament path around hooks 45 of central hub 24, while lace regions 58 show the filament path around hooks 45 of lower rim 42 of support ring 34. Another possible lace pattern is shown in FIG. 12, wherein laced regions 62 show the filament path around hooks 45 of central hub 24, while lace regions 60 show the filament path around hooks 45 of lower rim 42 of support ring 34. Of course, many other lacing patterns are possible. As shown in FIG. 13, the ends of filament 36 can be either tied off using an appropriate knot, or crimped tightly to each other to form a single loop of filament forming the desired pattern of filament spokes between central hub 24 and support ring 34. Lacing of the filament can be done efficiently using a CNC machine.

To create an upper propeller guard, filament 38 can be used to lace a predetermined pattern about filament hooks formed along upper rim 40 of support ring 34. The lace pattern can vary, but one possible pattern is shown in FIG. 4, which extends sufficiently inward from the support ring 34 to provide sufficient peripheral filament coverage adjacent to support ring 34 to allow a user to grab and hold onto the thrust pod without contacting a spinning propeller 28. The lace pattern of the upper propeller guard filament 38 also maintains an open central region which can reduce or minimize drag on the wind-flow generated by the propellers. There are a number of possible patterns for achieving this or a similar structure. In one embodiment, there are 24 hooks 45 formed along the upper and lower rims of support ring 34. A spoke or filament can be secured to upper rim at hook number 1 and then hook number 8, then back around the rim to hook number 6, then to hook number 15, then back around the rim to hook number 13, then forward to hook number 20 and back around the rim to hook number 18 and then forward to hook number 27, then back around the rim to hook number 25, then repeating the same pattern or forward 7 hooks, and back 2 hooks. This can be repeated until all hooks have spokes or filaments going to a hook number 7 over in the clockwise direction and counterclockwise direction. This same or a similar pattern can be repeated with a number of different combinations of numbers of hooks, number or skips, and number of hooks to wrap around the rim.

As another example, the spoke (or filament) can follow a path from hook number 1 to hook number 6, back around the rim to hook number 5, forward to hook number 11, and again repeat this pattern until complete. While described with respect to the use of a flexible material, such as Kevlar® or the like, in other embodiments a similar pattern can be pre-bent using a stiffer material, such as music wire or another relatively stiff material.

Depending on the number of rigid or filament spokes used in each thrust pod, the spacing between spokes may not allow propeller 28 to pass during the installation or removal of a propeller. In such embodiments, a cutout may be formed within support ring 34, which is sized and shaped to accommodate the passage of propeller 28 after the upper and lower propeller guards have been formed.

The resulting filament structures 36 and 38 create a protected space located between upper ring 40 and lower rim 42 of ring structure 34 within which propeller 28 may freely rotate. Since the filament structures are held in tension, the filament structures are considered tensegrity systems in that both filament structures create mechanical systems that are each in a stable self-equilibrated state comprising a compressed component (the support ring 34) held in place by a continuum of tensioned components (the filaments 36, 38).

Filament structures 36 and 38 form an effective guard protecting the propeller from contacting most solid objects and provide a support structure to hold motor 26, hub 2 and propeller 28 in place and effectively transmit thrust forces to body 12.

Although certain embodiments discussed above utilize a continuous length of filament material to creating filament "spokes" about support ring 34, other "spoke" structures and materials may be used in other embodiments. In some embodiments, single rigid spokes or other linear members, such as spokes similar to bicycle spokes, may be used to hold central hub 24 in place or to form an upper propeller guard. In this instance, such rigid members may be formed from a wide range of materials, including, but not limited to steel, titanium, nitinol, carbon fiber, Zylon®, and Kevlar®. Given the constraints, a material with maximum tensile strength can be use in order to minimize the weight and cross sectional area of spokes obstructing the flow of air into or out of the propellers, as the use of thinner filaments or members will result in increased sizes of the apertures between the filaments or members. Additionally, since the spokes can have significant pre-tension, materials which have low creep properties can be used, as creep of the members can reduce the tension in each spoke over time, possibly causing central hub 24 to wobble during use.

While any appropriate number of filament "spokes" or support members can be used, in some embodiments, between 20 to 30 filaments or rigid spokes can be used to provide protection to the propellers and users and support ring 34. However, larger or smaller numbers of spokes or members may be used in other embodiments.

When using a material such as metal wire that can remain in a bent position, the loop of wire can be bent in advance to form the approximate finished shape, as shown in FIG. 11. Preforming the desired shape or a similar shape can make assembly and alignment easier, and can help stiffer materials, such as music wire, to remain tightly wrapped in the desired shape with similar tensile loads in each of the filament spokes. This approach can be used for both propeller guard filament structure 38 and the lower central hub support filament structure 36.

In one embodiment, lower central hub support filament structure 36 can be created from two sets of spokes. Once set of spokes, which can be made from a preformed metal or any other suitable structure, as shown in FIG. 11 attaches from lower rim 42 of support ring 34 to the upper rim of central hub 24. A second set of spokes, which can also be made from a preformed metal or other suitable structure, as shown in FIG. 12 attaches between the lower rim 42 of support ring 34 and the lower rim of central hub 24. The vertical spacing between the two sets of spoke structures in the attachment point to the hub forms a triangle in side cross-section, which increases the axial stiffness of the hub. The relative length of the two sets of spoke structures can be varied in order to modify the vertical position of the hub relative to the spoke hooks, similar to "dish" in a rear bicycle wheel. In one particular embodiment, the upper spoke structure can be slightly shorter than the lower spoke structure, offsetting the hub downwards in order to move the swept volume of the propeller closer to the center of the volume inside of the propeller guard. In some embodiments, the lower spoke structure can be formed from high tensile strength high carbon steel, such as ASTM 228, often called music wire.

In some embodiments, foam can be affixed around a portion or all of the outside of the rim of the pods. This foam can be used to improve the crash resistance, aerodynamics, and reduce the chance of injuring a person or damaging property in the event of a crash. This foam can be made from a number of materials including expanded polystyrene, EVA foam, urethane foam, or any number of other materials capable of flexing in order to absorb and/or distribute impact energy. The foam or other protective material, as well as the pattern in which it is applied, may be chosen to reduce or minimize the size and/or weight of the protective material.

In some particular embodiments, a foam can be used which is capable of increasing in stiffness with increasing strain rates, often called visco-elastic foam or visco elastic polymer dough. Suppliers of these materials include d3o (d3o.com), g-form (g-form.com), POC (http://www.pocsports.com), and Rogers Corp (http://www.rogerscorp.com/hpf/poron/industrial/products/32/PORON-ShockPad-Foam.aspx).

Although the above described thrust pods 22 have been described for use with model RC quad-copters, similar structures and features may be applied to a wide variety of craft that employ a spinning propeller, such as fixed-wing propeller-driven airplanes, helicopters, multi-bladed helicopters, motor boats, and powered paragliders. Multi-bladed helicopters, often referred to as multi-copters, can include any number of rotating propellers, with 3 (tricopter), 4 (quadcopter), 6 (hexacopter), or 8 (octocopter) propellers used in common configurations.

When used in multicopters, the thrust pods 22 can be connected to additional components necessary for flight, such as control electronics, sensors, and a battery or other power source. Additional sensors or payloads, such as cameras, can in some embodiments be attached to the same system. Wireless radios can also be used to establish a communication and control link between the multicopter and the operator. These components can be configured in a number of possible configurations. In one practical embodiment, the control electronics, battery, and payload are contained within or attached to a central body, called the fuselage. The pods can then be attached to the fuselage using any appropriate mechanical and/or electrical connections, such that power can be transmitted from the battery to the motors, the speed of the motors can be controlled by the control electronics, and the force from thrust from the propellers can be coupled to the rest of the system.

In some embodiments, a vibration isolation joint can be disposed between the pods and the fuselage in order to isolate any vibration sensitive sensors in the fuselage from the vibrations produced from the motors. This can be particularly useful when the fuselage contains a camera for capturing video, as the image quality of most cameras degrades when subject to the high frequency vibrations produced by spinning propellers. One example of such a mount can be purchased from Hobby King at URL: http://www.hobbyking.com/hobbyking/store/_40603_Vibration_Damping_Ball_65g_Bag_of_8_.html.

Additionally, in some embodiments the pods can be easily connected and disconnected from the fuselage, both for easy transportation and to enable the system to easily separate apart upon impact with the ground, reducing the stress on the frame and potential for damage.

In some embodiments, as discussed above, magnets can be used to create the connection between the pods and the fuselage. Many other possible mechanical connection means can be used for creating this breakaway connection including, but not limited to, snap hooks, hook-and-loop connections, zippers, electromagnets, and suction cups. In some embodiments, a method for attaching the pod pair to the fuselage includes the use of high strength rare earth magnets, such as neodymium magnets. While any number of magnets can be used, some embodiments utilize an arrangement of three magnets per pod assembly. In some particular embodiments, these magnets may be arranged in a triangle pattern with the base of the triangle facing the nose or tail or the fuselage and the point of the triangle oriented towards the middle of the fuselage. The use of three magnets can be used to compel a particular orientation of a pod pair assembly.

An electrical connection can be provided between the pods and the fuselage in order to drive the propeller motors. A number of alternatives are possible for the architecture of this connection, including, but not limited to three wires (two powers and common ground) for controlling two brushed motors, four wires (two powers and two grounds) for controlling two brushed motors, and six wires for controlling two brushless motors, or power and data connections with control electronics for the motors being part of the pod pair assembly. A number of alternatives exist for the data connection, including, but not limited to, USB, UART, CAN, SPI, and I2C, with different number of data wires depending on the data protocol.

Figure 3:
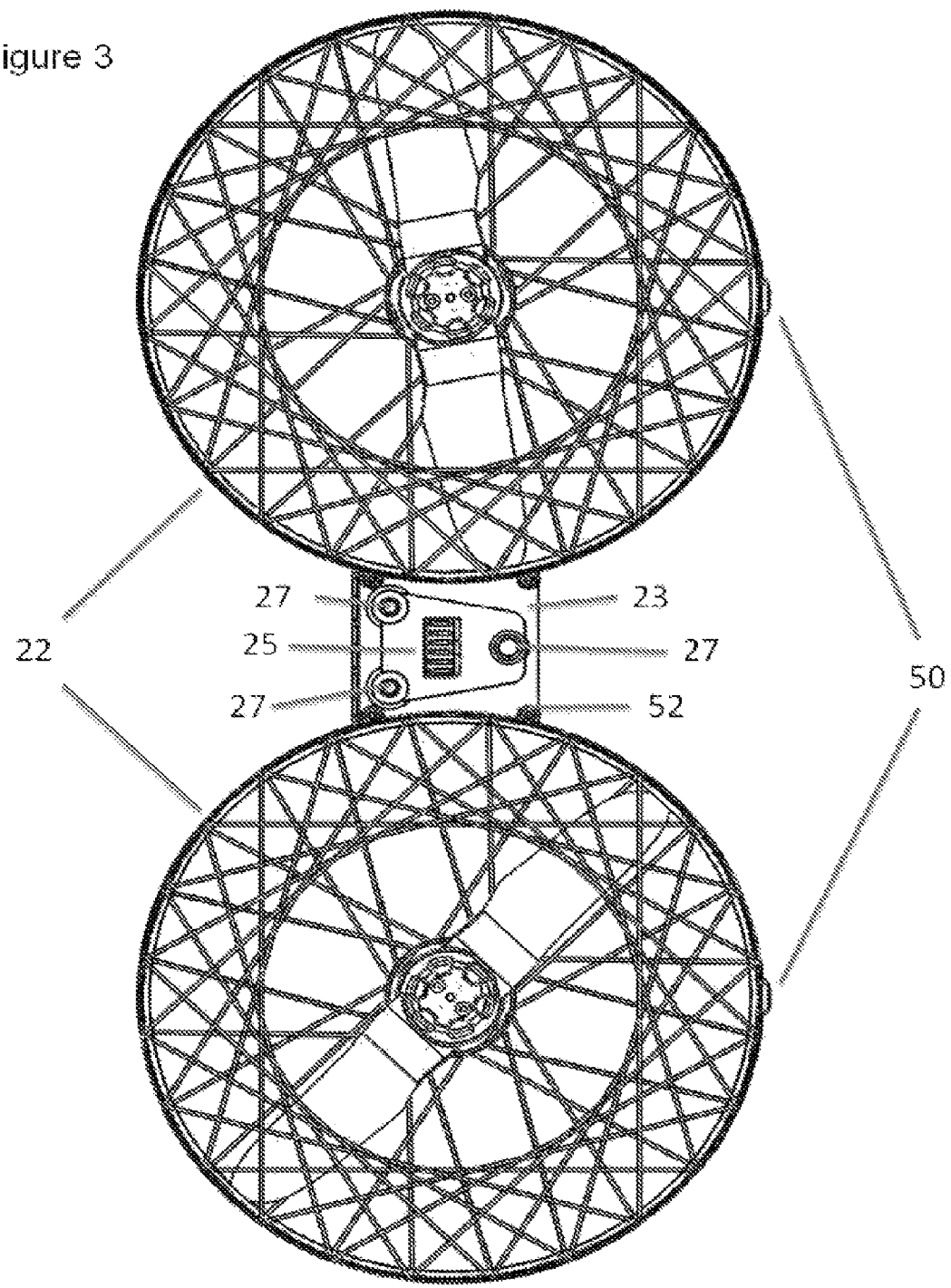
FIG. 3 is a top plan view of a front pod assembly, including two thrust pods connected to each other by a bridge support, each thrust pod having a central hub, a central motor, a propeller, and a propeller guard assembly.
Figure 28:
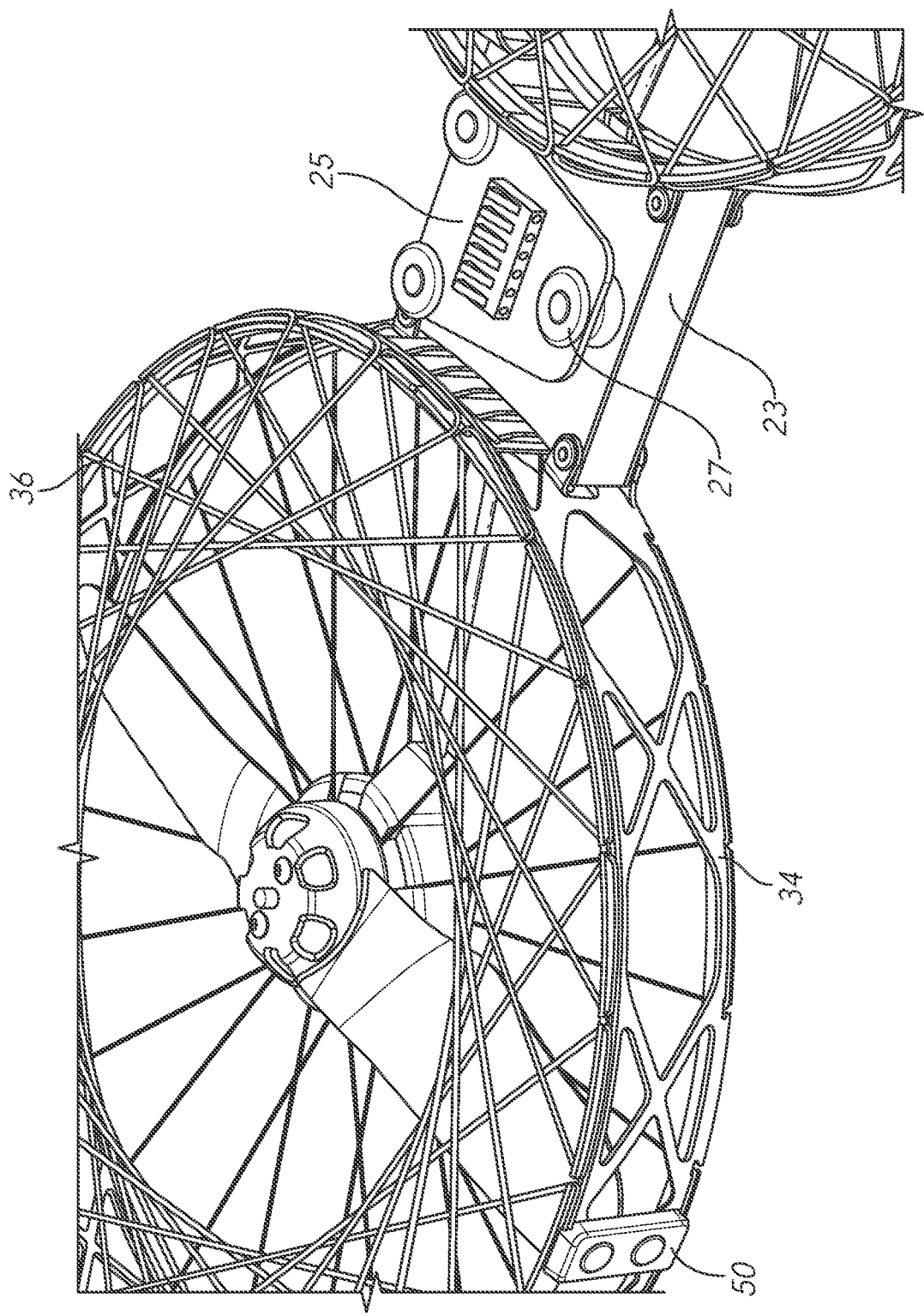
FIG. 28 is a perspective view of the upper side of a thrust pod showing details of the central motor, the central hub, the bridge support and the upper guard filaments.
Figure 29:
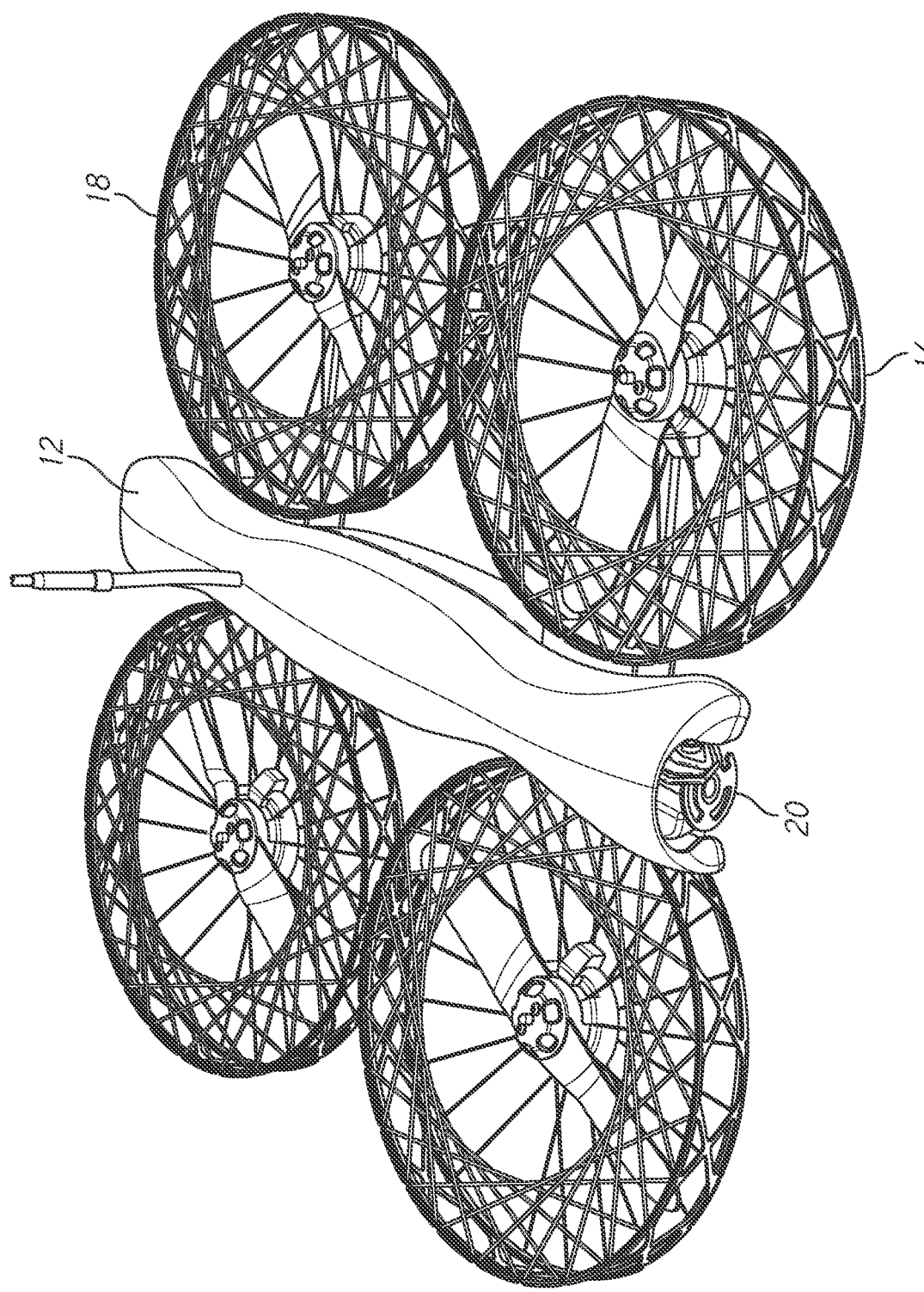
FIG. 29 is an upper perspective view of a fully assembled UAV.

Two or more pods can be rigidly connected to each other and then attached to the fuselage. When used in a quadcopter, some embodiments can join two pods together by connecting the rim of each pod with a section of material wide enough to fit the fuselage in between the two pods. Two pairs of pods can be connected to the fuselage in this manner. When the pods are connected to the fuselage using flexible vibration isolation mounts, the rims of each pair of pods can be connected to the rims of the adjacent pod such that all four pods form a rigid structure. In some embodiments, this connection can be a releasable coupling which can be easily broken, both for assembly and disassembly and to limit stresses in the event of a crash. There are a number of possible mechanisms for making this connection, including, but not limited to, snap hooks, hook-and-loop connections, magnets, suction cups, and other mechanical interlocking features. As shown in FIGS. 2, 3, and 28, in some embodiments, two magnets 50 can be affixed in a vertical orientation on the support ring 34 of each pod assembly in the portion tangent to the adjacent pod with different polarities for the top and bottom magnet, such that the pair of magnets can only bond in the correct orientation and can break away easily in the event of a crash or disassembly. In some other embodiments, a more permanent connection, such as a hinged connection, can be made between adjacent pods, such that the two pod pair assemblies can be folded relative to one another. In some particular embodiments, this connection may include a living hinge formed between the adjacent pods.

Bridge support 23 is a rigid connection between adjacent thrust pods 22 (making up a pod assembly 16, 18) can be made in a number of different ways including the use of sheet metal parts, injection molded parts, and composite parts. In some embodiments, a bridge support 23 which is rigid, strong, and lightweight can be formed using two sheets of carbon fiber composite separated by a plastic injection molded spacer. Holes that are formed in four corners of each layer of this assembly are used to capture a screw that goes from a first upper mounting tab 52 of one thrust pod 22, through the carbon top sheet, through the plastic spacer, through the carbon bottom sheet, through a lower mounting tab 52 and then terminated with a nut, used to squeeze the entire assembly tightly together. Other methods of forming the bridge support 23, and of securing the bridge support 23 to the thrust pods 22, can also be used.

The rigid connection between the pair of thrust pods (or more) can also include at least one hinge to enable the pair of pods to fold for improved portability.

An additional mechanical and/or electrical connection can be provided on an external surface of the pod pair to enable additional modules to be connected to the pod pairs. Possible modules include, but are not limited to, sonar, optical flow sensors, lights, cellular data connections, cameras, or LIDAR sensors. In many cases, it is beneficial to have both a power and data connection back to the fuselage. This can be accomplished in a number of possible ways, including, but not limited to, having a power and data connection between the pod pair and the fuselage and using the power from the same connection to power the additional module. In some embodiments, a CAN bus can be used for the data connection and the additional module can share the same data connection between the pod pair and the fuselage.

In order to be able to easily connect and disconnect the pod pairs from the fuselage and have the assembly cleanly disconnect in the event of the crash, the electrical connection can be designed to be able to disconnect with forces from a range of possible directions. Pogo pins or leaf spring type electrical connectors making contact with a flat or slightly cupped female connection are two examples of electrical connections which can provide such features. The male and female sides of the electrical connector can be on either the pod pair or fuselage or some combination thereof.

In order to ensure that the electrical connectors mate with the appropriate contacts, a mechanical alignment feature can be used. However, a feature with mating vertical or near vertical walls has the potential to get stuck or not break away cleanly in the event of an impact from the side. In some embodiments, mating sloping angles on mechanical alignment features of approximately 15 to 45 degrees can provide mechanical alignment while also allowing the connector to break cleanly away during a side impact. Such structures can also facilitate alignment during assembly, by providing lead-in as the connection is being made. By way of example, see angled features 66 on body 12 in FIG. 20.

In some embodiments, a conductive outer rim of the pods or another conductive portion of the pods can be used as a capacitive sensor to sense hand contact, nearby obstacles, or nearby people and take an appropriate control response.

By suspending each motor within a rigid support ring 34 using either spokes or filaments, vibrations created by a running motor will be dampened, thereby protecting all the components of the UAV from the otherwise dangerous vibrations.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An unmanned aerial vehicle (UAV), comprising:
a UAV body;
a plurality of shielded propellers releasably secured relative to the UAV body, each shielded propeller including:
a propeller;
an outer guard ring; and
protective structures extending radially inward from the outer guard ring on opposite sides of the propeller;
a battery housing releasably secured relative to the UAV body, wherein at least one of the battery housing or the plurality of shielded propellers are releasably secured to the UAV body solely via a mechanical coupling mechanism magnetically securing said one of the battery housing or the plurality of shielded propellers during use of the UAV and allowing said one of the battery housing or the plurality of shielded propellers to completely separate from the UAV body upon impact of the UAV with another object.

2. The UAV of claim 1, wherein the protective structures of the plurality of shielded propellers comprise a plurality of apertures extending through the protective structures to reduce the impact of protective structures on airflow from the propellers.

3. The UAV of claim 1, wherein the plurality of shielded propellers includes a first pair of shielded propellers having a bridge structure extending between the outer guard rings of the first pair of shielded propellers, the bridge structure including an electrical coupling mechanism and the mechanical coupling mechanism.

4. The UAV of claim 3, wherein:
the electrical coupling mechanism includes a plurality of electric contacts configured to provide power and control to the first pair of shielded propellers; and
the mechanical coupling mechanism includes a plurality of magnets configured to releasably secure the bridge structure relative to the UAV body.

5. The UAV of claim 4, wherein the plurality of magnets includes a first arrangement of magnets on the bridge structure and a second arrangement of magnets on the UAV body configured for alignment with the first arrangement of magnets on the bridge structure, and arranged in a pattern which compels a particular orientation of the first pair of shielded propellers relative to the UAV body.

6. The UAV of claim 3, wherein the plurality of shielded propellers includes a second pair of shielded propellers having a bridge structure extending between the outer guard rings of the first pair of shielded propellers, and wherein at least one guard ring of the first pair of shielded propellers is configured for magnetic securement relative to at least one guard ring of the second pair of shielded propellers.

7. The UAV of claim 6, wherein the at least one guard ring of the first pair of shielded propellers includes a first plurality of magnets and the at least one guard ring of the second pair of shielded propellers includes a second plurality of magnets configured for alignment with a first plurality of magnets, and wherein the first and second plurality of magnets are arranged such that the polarities of the first and second plurality of magnets compel a particular orientation between the first and second pairs of shielded propellers.

8. The UAV of claim 1, wherein the battery housing includes:
an electrical coupling mechanism including a plurality of electric contacts configured to place the battery in electric communication with the UAV body; and
the mechanical coupling mechanism, the mechanical coupling mechanism including at least one magnet configured to releasably secure the battery housing relative to the UAV body.

9. The UAV of claim 1, wherein the plurality of shielded propellers include a first pair of shielded propellers having a bridge structure extending between the outer guard rings of the first pair of shielded propellers, the bridge structure including an electrical coupling mechanism and the mechanical coupling mechanism, the UAV additionally comprising:
a camera module; and
a vibration isolation mechanism for isolating the camera module from the vibration of the plurality of shielded propellers, wherein the vibration isolation mechanism forms a part of a mechanical connection between the mechanical coupling mechanism and the first pair of shielded propellers.

10. The UAV of claim 1, wherein the outer guard rings of the plurality of shielded propellers comprise a strip of material which is bent to form a cylindrical ring structure.

11. An unmanned aerial vehicle (UAV), comprising:
a UAV body, the UAV body comprising an attachment site including an electrical connector and a magnetic connector; and
a power source magnetically secured to the UAV body at the attachment site, the magnetic securement between the power source and the UAV body retaining the power source in place during use of the UAV and allowing the power source to completely separate from the UAV body upon impact of the UAV with another object.

12. The UAV of claim 11, wherein the power source comprises a battery.

13. The UAV of claim 11, wherein the UAV body additionally comprises a second attachment site including a second electrical connector and a second magnetic connector, the UAV additionally comprising a thrust assembly magnetically secured to the UAV body at the second attachment site.

14. The UAV of claim 13, wherein the thrust assembly comprises a propeller.

15. The UAV of claim 14, wherein the propeller comprises an outer guard ring extending around the periphery of the propeller, and protective structures extending radially inward from the outer guard ring on opposite sides of the propeller.

16. The UAV of claim 13, wherein the thrust assembly comprises a gas-powered engine.

17. An unmanned aerial vehicle (UAV), comprising:
a UAV body, the UAV body comprising an attachment site including an electrical connector and a magnetic connector;
a propeller assembly magnetically secured to the UAV body at the attachment site, the magnetic securement between the propeller assembly and the UAV body retaining the propeller assembly in place during use of the UAV and allowing the propeller assembly to completely separate from the UAV body upon impact of the UAV with another object.

18. The UAV of claim 17, wherein the propeller assembly additionally comprises an isolation mechanism for isolating the UAV body from vibration of the propeller assembly.

19. The UAV of claim 18, wherein the propeller assembly includes a mechanical coupling mechanism attaching the propeller assembly to the attachment site, and wherein the mechanical coupling mechanism is connected to the vibration isolation mechanism.

20. The UAV of claim 17, wherein the UAV body additionally comprises a second attachment site including a second electrical connector and a second magnetic connector, the UAV additionally comprising a power source magnetically secured to the UAV body at the second attachment site, the magnetic securement between the power source and the UAV body retaining the power source in place during use of the UAV and allowing the power source to completely separate from the UAV body upon impact of the UAV with another object.

21. The UAV of claim 20, wherein the power source comprises a battery.

22. The UAV of claim 17, wherein the UAV body additionally comprises a second attachment site including a second electrical connector and a second magnetic connector, the UAV additionally comprising a second propeller assembly magnetically secured to the fuselage at the second attachment site.

23. The UAV of claim 17, wherein the propeller assembly comprises a propeller, an outer guard ring extending around the periphery of the propeller, and protective structures extending radially inward from the outer guard ring on opposite sides of the propeller.

* * * * *